(12) United States Patent
Uchiyama et al.

(10) Patent No.: US 9,932,017 B2
(45) Date of Patent: Apr. 3, 2018

(54) VEHICLE WIPER

(71) Applicant: ASMO CO., LTD., Kosai, Shizuoka-pref. (JP)

(72) Inventors: Keita Uchiyama, Hamamatsu (JP); Yoshiyuki Uchino, Iwata (JP); Kouichi Hirao, Hamamatsu (JP); Takao Yoshimoto, Toyohashi (JP); Akio Shimizu, Kosai (JP)

(73) Assignee: ASMO CO., LTD., Kosai (JP)

( * ) Notice: Subject to any disclaimer, the term of this patent is extended or adjusted under 35 U.S.C. 154(b) by 60 days.

(21) Appl. No.: 14/927,490

(22) Filed: Oct. 30, 2015

(65) Prior Publication Data

US 2016/0121853 A1  May 5, 2016

(30) Foreign Application Priority Data

Nov. 5, 2014 (JP) ................ 2014-225407
Nov. 13, 2014 (JP) ................ 2014-230983
Mar. 9, 2015 (JP) ................ 2015-046175
Mar. 17, 2015 (JP) ................ 2015-053566
Jul. 3, 2015 (JP) ................ 2015-134082
Jul. 3, 2015 (JP) ................ 2015-134084

(51) Int. Cl.
  *B60S 1/52* (2006.01)
  *B60S 1/34* (2006.01)
  *B60S 1/38* (2006.01)

(52) U.S. Cl.
  CPC ............ *B60S 1/522* (2013.01); *B60S 1/3415* (2013.01); *B60S 1/3468* (2013.01); *B60S 1/3413* (2013.01); *B60S 1/3481* (2013.01); *B60S 1/3484* (2013.01); *B60S 1/3805* (2013.01)

(58) Field of Classification Search
  CPC ...... B60S 1/522; B60S 1/3484; B60S 1/3481; B60S 1/3479; B60S 1/3425; B60S 1/3431; B60S 1/3429; B60S 1/3415; B60S 1/482
  USPC .......................... 15/250.04, 250.351, 250.02
  See application file for complete search history.

(56) References Cited

U.S. PATENT DOCUMENTS 1,726,817 A * 9/1929 Franklin ................. E01F 9/627
                                                             116/63 R
2,766,437 A * 10/1956 Ahlgren ............... H01R 11/282
                                                             439/387
2,781,540 A * 2/1957 Deibel ...................... B60S 1/34
                                                             15/250.21

(Continued)

FOREIGN PATENT DOCUMENTS

JP    2002-536244 A    10/2002
JP    2002-321599 A    11/2002

(Continued)

*Primary Examiner* — Andrew A Horton
(74) *Attorney, Agent, or Firm* — Solaris Intellectual Property Group, PLLC

(57) ABSTRACT

A vehicle wiper comprises a retainer that is formed in an elongated shape open at the lower side facing toward a windshield, and that is provided so as to be capable of swinging about a shaft axis of a pivot shaft that is swung to-and-fro; a first nozzle member that is housed inside the retainer, and that is capable of ejecting washer fluid from an ejection portion; and 1 a retainer cover member that closes off an opening of the retainer, and that is formed with a window through which the ejection portion of the first nozzle member is externally exposed.

15 Claims, 25 Drawing Sheets

(56) References Cited

U.S. PATENT DOCUMENTS

| | | | | |
|---|---|---|---|---|
| 2,850,755 | A | * | 9/1958 | Deibel ............... B60S 1/34 15/250.34 |
| 3,042,955 | A | * | 7/1962 | Oishei ............... B60S 1/34 15/250.351 |
| 3,149,361 | A | * | 9/1964 | Ziegler .............. B60S 1/34 15/250.04 |
| 4,586,913 | A | * | 5/1986 | Nagano ............. B62M 9/136 474/80 |
| 6,442,788 | B1 | | 9/2002 | Fleischer |
| 6,804,854 | B2 | | 10/2004 | Hasegawa et al. |
| 2002/0020034 | A1 | * | 2/2002 | Choi ................ B60S 1/0491 15/250.351 |
| 2013/0219647 | A1 | | 8/2013 | Calluiere et al. |
| 2015/0113754 | A1 | | 4/2015 | Umeno |

FOREIGN PATENT DOCUMENTS

| | | | | |
|---|---|---|---|---|
| JP | 3717416 | B2 | | 11/2005 |
| JP | 5215519 | B2 * | 6/2013 | ............... B60S 1/32 |
| JP | 2013-538743 | A | | 10/2013 |

\* cited by examiner

VEHICLE WIPER

CROSS-REFERENCE TO RELATED APPLICATIONS

This application claims priority under 35 USC 119 from Japanese Patent Application No. 2014-225407 filed on Nov. 5, 2014, Japanese Patent Application No. 2014-230983 filed on Nov. 13, 2014, Japanese Patent Application No. 2015-46175 filed on Mar. 9, 2015, Japanese Patent Application No. 2015-53566 filed on Mar. 17, 2015, and Japanese Patent Applications No. 2015-134082 and No. 2015-134084 filed on Jul. 3, 2015, the disclosures of which are incorporated by reference herein.

BACKGROUND OF THE INVENTION

Technical Field

The present invention relates to a vehicle wiper.

Related Art

Hitherto, there have been wiper arms of vehicle wipers that include an arm head and a retainer, with, for example, retainers having a cross-section orthogonal to the length direction formed in a substantially angular-U shape open on the lower side facing toward the wiping surface, with the opening of the retainer closed off with a cover (see, for example, the specification of U.S. Pat. No. 2,850,755). Such vehicle wipers mainly enhance the appearance from inside the vehicle cabin, during wiping, and are able to suppress the effects of passing wind penetrating into the retainer through the opening.

Moreover, as a vehicle wiper, sometimes a nozzle member for ejecting washer fluid is disposed within a length direction intermediate portion of a retainer open on the lower side facing toward the wiping surface. In such cases, since it is not possible to eject from the nozzle member if the opening of the retainer is closed off with a cover, a cutaway portion is formed at the side wall of the retainer, and ejection is achieved by projecting the nozzle member out from cutaway portion (see, for example, Japanese Patent Application Laid-Open (JP-A) No. 2002-321599).

However, a vehicle wiper is a design component disposed on the vehicle exterior, and there is some concern that a cutaway portion in the retainer for projecting the nozzle member might be detrimental to styling the vehicle wiper, and hence might be detrimental to styling of the car (Issue 1).

A hose for supplying washer fluid to the nozzle member needs to be laid out along the length direction of the wiper arm. In such cases, for example, sometimes a long wave-shaped grove is formed in the back face of an arm head configuring a wiper arm, and the hose is laid out and retained by being fitted into the long groove (see, for example, Japanese Patent No. 3717416).

However, the back face side of the arm head is complicated in such vehicle wipers, and, in particular, it is difficult to form long grooves when there is a desire to lay out two hoses (Issue 2).

Moreover, in the vehicle wiper of U.S. Pat. No. 2,850,755, the retainer is coupled to the arm head so as to be capable of swinging. Specifically, the retainer is capable of swinging with respect to the arm head between a wiping position, disposed facing a windshield, and a flipped-up position, flipped up away from the windshield. A tension spring is also provided inside a base end portion of the retainer, spanning across between the retainer and the arm head. Configuration is thereby achieved in which the retainer is urged to the wiping position side or to the flipped-up position side by the urging force of the tension spring.

However, in cases in which an urging spring is employed in place of the above tension spring, there is a tendency for the oriented position of the urging spring with respect to the retainer to change greatly when the retainer swings with respect to the arm head. Specifically, when the retainer is disposed in the flipped-up position, the urging spring is closer to the cover than in cases in which the retainer is disposed in the wiping position. There is accordingly a concern of the urging spring hitting the cover, and not being able to maintain a good attachment state of the cover (Issue 3).

Generally, the width dimension of a retainer is set so as to get gradually smaller on progression toward the leading end side. Therefore, in order to attach the leading end portion of the cover to the portion at the leading end side of the retainer, a structure to engage the cover may be envisaged in which, for example, an engagement hook of the cover engages with a side wall of the retainer. However, in such cases there is a need to form a hole or the like at the wall of the retainer for the engagement hook to engage with. This may be detrimental to the appearance of the vehicle wiper (Issue 4).

There have hitherto been devices further including a conductor wire embedded in a hose for heating washer fluid (see, for example, Japanese National Phase Publication No. 2013-538743).

In such vehicle wipers, it is possible to thaw washer fluid in a frozen state inside the nozzle member and the hose.

However, in a configuration such as in the above vehicle wiper in which a conductor wire is laid out along a hose, there is a concern that a large tensile force may act on the conductor wire at the position corresponding to the moveable coupling portion of the wiper arm, and may cause a line break. For example, in a configuration of a wiper arm provided with a retainer that is capable of swinging with respect to the arm head, in which a hose and a conductor wire are laid out along the lower face of the wiper arm (the face on the wiping surface side), when the retainer is in the flipped-up position away from the wiping surface, a tensile force acts on the hose and the wire at the position corresponding to this coupling portion. In such a situation, the hose is readily extended, however the conductor wire does not readily extend, and so there is a concern for line breakages. It is possible to prevent a tensile force form acting on the conductor wire by providing a slack portion in the conductor wire at the coupling portion of the retainer to the wiper arm. However, in such cases, a longer conductor wire is required, a space is necessary in which the slack portion of the conductor wire can move freely, and the slack portion of the conductor wire provides the detrimental effect on the aesthetics (Issue 5).

SUMMARY

In consideration of the above Issue 1, the present invention provides a vehicle wiper capable of ejecting washer fluid from a nozzle member disposed inside a retainer without a detrimental effect on styling, even in cases in which the opening of the retainer is closed off by a cover.

In consideration of the above Issue 2, the present invention provides a vehicle wiper that achieves an optimum layout of a hose for supplying washer fluid to a nozzle member, while also improving styling.

In consideration of the above Issue 3, the present invention provides a vehicle wiper that is capable of maintaining a good attachment state of the cover.

In consideration of the above Issue 4, the present invention provides a vehicle wiper in which a cover can be attached to a portion at the leading end side of the retainer while improving the appearance.

In consideration of the above Issue 5, the present invention provides a vehicle wiper capable of suppressing a large tensile force from acting on a conductor wire without providing slack in the conductor wire.

A vehicle wiper of a first aspect of the present invention includes: a retainer that is formed in an elongated shape open at a lower side facing toward a windshield, and that is provided so as to be capable of swinging about a shaft axis of a pivot shaft that is swung to-and-fro; a first nozzle member that is housed inside the retainer, and that is capable of ejecting washer fluid from an ejection portion; and a retainer cover member that closes off an opening of the retainer, and that is formed with a window through which the ejection portion of the first nozzle member is externally exposed.

According to the configuration of the first aspect, even though the opening of the retainer is closed off by the retainer cover member, the ejection portion of the first nozzle member disposed inside the retainer can still be externally exposed through the window of the retainer cover member that closes off the opening, enabling washer fluid to be ejected from an opening side of the retainer. This thereby enables washer fluid to be ejected from the ejection portion of the first nozzle member without causing deterioration in the styling of the vehicle wiper.

The above vehicle wiper preferably includes: an arm head whose base end portion is fixed to the pivot shaft, and whose leading end portion is coupled to the retainer so as to be capable of swinging; an urging mechanism that is housed inside a length direction base end side of the retainer, and that urges the leading end side of the retainer toward the windshield side; and a first hose, that is housed inside the retainer, and that supplies washer fluid to the first nozzle member, wherein a partitioning wall is provided at the retainer cover member and extends so as to be interposed between the urging mechanism and the first hose.

According to the above configuration, the partitioning wall is provided at the retainer cover member extending so as to be interposed between the urging mechanism and the first hose, partitioning between the urging mechanism and the first hose, and thereby enabling the first hose to be prevented from making contact with the urging mechanism.

The above vehicle wiper, preferably includes: a second nozzle member that is provided at a length direction leading end portion of the retainer, or that is provided at a wiper blade coupled to the length direction leading end portion of the retainer, and that is capable of ejecting washer fluid from an ejection portion onto the opposite side of the wiper blade from that of the first nozzle member; and a second hose that is housed inside the retainer and that supplies washer fluid to the second nozzle member, wherein the first and second hoses are provided side-by-side along the length direction of the retainer and the first hose is disposed on one side of the urging mechanism and the second hose is disposed on the other side of the urging mechanism, and the partitioning wall is respectively formed on both sides of the urging mechanism so as to be interposed between the urging mechanism and the two hoses.

According to the above configuration, the first and second hoses are disposed side-by-side along the length direction of the retainer and are disposed on the both sides of the urging mechanism, and the partitioning wall is respectively formed on the both side of the urging mechanism. This thereby enables the first and second hoses to be prevented from contacting the urging mechanism, while the urging mechanism is disposed at the width direction center and urges the retainer with good balance.

In the above vehicle wiper, preferably, by slit-forming, s portion of the partitioning wall configures a resilient tab capable of flexing in a direction orthogonal to the extension direction of the partitioning wall, and an engaging portion that engages with an engaged portion of the retainer is formed at a leading end portion of the resilient tab.

According to the above configuration, by slit-forming, a portion of the partitioning wall configures a resilient tab capable of flexing in a direction orthogonal to the extension direction of the partitioning wall, and an engaging portion that engages with an engaged portion of the retainer is formed to a leading end portion of the resilient tab. This thereby enables the retainer cover member to be assembled to the retainer while utilizing a portion of the partitioning wall as the resilient tab. Namely, due to common use of the resilient tab and a portion of the partitioning wall, the structure is simpler than in cases in which the resilient tab is formed separately at another position of the retainer cover member and the engaging portion is formed at the resilient tab.

In the above vehicle wiper, preferably, a hose restricting section that restricts flapping of the second hose for supplying washer fluid to the second nozzle member is formed to the first nozzle member.

According to the above configuration, since the hose restricting section that restricts flapping of the second hose is formed at the first nozzle member, flapping of the second hose can be restricted without increasing the number of components.

In the above vehicle wiper, preferably, a resilient fixing tab is formed at the first nozzle member for positional fixing of the first nozzle member itself to the retainer, and the hose restricting section includes the resilient fixing tab.

According to the above configuration, due to the resilient fixing tab being formed at the first nozzle member for positional fixing of the first nozzle member itself to the retainer, and the hose restricting section including the resilient fixing tab, flapping of the second hose can be restricted by using the resilient fixing tab. Namely, due to common use of the resilient fixing tab and the hose restricting section, for example, the first nozzle member can be made more compact than cases in which hose restricting section is formed separately at another position of the first nozzle member.

In the above vehicle wiper, preferably, at least a portion of the retainer cover member is fixed to the first nozzle member.

According to such a configuration, due to the portion of the retainer cover member being fixed to the first nozzle member, for example, there is no need to form a hole in the retainer for fixing, enabling a detrimental effect on the appearance of the retainer due to the fixing structure to be avoided.

A vehicle wiper of a second aspect of the present invention is the vehicle wiper of the first aspect, further including a head cover member that is attached so as to permit relative swing between the arm head and the retainer while also closing off an opening of the arm head, wherein the retainer cover member is attached so as to permit relative swing between the arm head and the retainer.

According to the above configuration, the hose for supplying the washer fluid to the nozzle member is housed inside the arm head, and also spans across to the retainer so as to be housed in the retainer. Since the head cover member is attached so as to permit relative swing between the arm head and the retainer while also closing off the opening of the arm head, and the retainer cover member is attached so as to permit relative swing between the arm head and the retainer while closing off the opening of the retainer, the hose can be laid out so as to span from the arm head to the retainer in a state in which it is not substantially visible from the outside, without impeding the relative swinging.

In the above vehicle wiper, at least one of the head cover member or the retainer cover member includes a resilient engagement fixing portion that engages with an engaged fixing portion provided at the corresponding at least one of the arm head or the retainer. Preferably, the resilient engagement fixing portion includes a first resilient tab that is provided extending along the assembly direction of the head cover or the retainer cover member, a second resilient tab that extends from a leading end portion of the first resilient tab so as to fold back on itself, and an engaging fixing portion that is provided at the leading end portion of the second resilient tab and engages with the engaged fixing portion.

According to the above configuration, due to the resilient engagement fixing portion including the first resilient tab that is provided extending along the assembly direction, the second resilient tab that extends from a leading end portion of the first resilient tab so as to fold back on itself, and the engaging fixing portion that is provided at the leading end portion of the second resilient tab and engages with the engaged fixing portion, a large elastic displacement amount of the engaged fixing portion can be achieved while suppressing the height thereof in the extension direction to a low height. In other words, a large elastic displacement amount of the engaged fixing portion is achieved, as the leading end side of the first resilient tab flexes with the base end portion of the first resilient tab as a fulcrum and also the leading end side of the second resilient tab flexes with the base end portion of the second resilient tab (the leading end portion of the first resilient tab) acting as a fulcrum. Moreover, the height of the resilient engagement fixing portion can be suppressed to a low height in the extension direction by the second resilient tab extending so as to fold back on itself. Thus while assembly is easy due to the larger elastic displacement amount of the engaged fixing portion, the arm head and the retainer are also able to be made thinner due to suppressing the height of the resilient engagement fixing portion to a low height in the extension direction.

In the above vehicle wiper, preferably, the head cover member and the retainer cover member are respectively attached to the arm head and the retainer in a mutually separated state at a coupling location where the arm head and the retainer are coupled together so as to be capable of swinging.

According to the above configuration, due to the head cover member and the retainer cover member being respectively attached to the arm head and the retainer in a mutually separated state at a coupling location of the arm head and the retainer, the spacing separating the head cover member and the retainer cover member changes as the retainer swings with respect to the arm head, and the hose can be laid out so as to span from the arm head to the retainer in a state in which the hose is not substantially visible from the outside, without impeding the swinging.

A vehicle wiper of a third aspect of the present invention is the vehicle wiper of the first aspect, the urging mechanism includes an urging spring disposed inside a base end portion of the retainer, and that uses urging force of the urging spring to urge the retainer toward a wiping position side disposed facing the windshield, or toward a flipped-up position side flipped away from the windshield. Wherein, the retainer swings with respect to the arm head between the wiping position and the flipped-up position, and a cutout is formed at the base end portion of the retainer cover member so as to expose a portion of the urging spring toward the windshield side.

According to the above configuration, the retainer is configured so as to swing with respect to the arm head between the wiping position disposed facing the windshield and the flipped-up position flipped away from the windshield. The urging spring configuring the urging mechanism is disposed inside the base end portion of the retainer, and the retainer is urged toward the wiping position side, or toward the flipped-up position side, by the urging force of the urging spring.

The cutout is formed at the base end portion of the retainer cover member so as to expose a portion of the urging spring toward the windshield side through the cutout. This thereby enables interference between the urging spring and the retainer cover member to be prevented even when the urging spring approaches the retainer cover member when the retainer is positioned in the flipped-up position. Thus a good attachment state of the retainer cover member can be maintained.

In the above vehicle wiper, preferably, a base end side engagement portion that engages with the retainer is formed at a base end portion of the retainer cover member at both sides in the retainer cover member width direction of the cutout.

According to the above configuration, the base end portion of the retainer cover member formed with the cutout can be engaged with the retainer using the base end side engagement portions. This thereby enables the attached state of the retainer cover member to be maintained even better.

A vehicle wiper of a fourth aspect of the present invention is the vehicle wiper of any of the first to the third aspects, wherein: the retainer is set with a width dimension that becomes smaller on progression toward the leading end side, and, at a position at the leading end side of the opening of the retainer, is formed with a first engagement portion that projects out toward the inside from a side wall on one side in the width direction of the retainer; and a first engagement hook is formed at a leading end portion of the retainer cover member, with the first engagement hook configured so as to be elastically deformable in the length direction of the retainer cover member and to engage with the first engagement portion and restrain movement of the leading end portion of the retainer cover member toward the windshield side. Moreover, a second engagement portion is formed at a position on a base end side of the opening of the retainer with respect to the first engagement portion, the second engagement portion projects out from the side wall on the one side in the width direction of the retainer toward the inside; a second engagement hook configured so as to be elastically deformable in the length direction of the retainer cover member is formed at a position on a base end side of the retainer cover with respect to the first engagement hook; and the second engagement hook engages with the second engagement portion and restrains movement of the leading end portion of the retainer cover member toward the windshield side.

According to the above configuration, the width dimension of the retainer is set so as to become smaller on progression toward the leading end side of the retainer, and at a position at the leading end side of the opening of the retainer is formed with the first engagement portion that projects out toward the inside from the side wall on the one width direction side of the retainer. Moreover, the first engagement hook is formed at the leading end portion of the retainer cover member, with the first engagement hook configured so as to be elastically deformable in the length direction of the retainer cover member, and to engage with the first engagement portion and restrain movement of the leading end portion of the retainer cover member toward the windshield side. Thereby, the first engagement portion and the first engagement hook can be disposed in a row along the length direction of the retainer, and the leading end portion of the retainer cover member can be attached to the retainer in a state that the first engagement hook is elastically deformable in a direction along the length direction of the retainer cover member. This thereby enables sufficient displacement of the first engagement hook to be secured without being restricted by the width dimension of the retainer, even at the portion at the leading end side of the retainer where the width dimension is small, and enables the leading end portion of the retainer cover member to be securely attached to the retainer. Additionally, due to the first engagement hook being engaged with the first engagement portion that projects out from a side wall on the one width direction side of the retainer toward the opening of the retainer, the engaged state between the first engagement hook and the first engagement portion can be suppressed from being visible from the windshield side.

Moreover, movement of the leading end portion of the retainer cover member toward the windshield side can also be restrained by the second engagement hook, in addition to the first engagement hook. Due to the second engagement hook also being configured so as to be capable of deforming in a length direction of the retainer cover member, movement of the retainer cover member in the length direction can be restrained by the first engagement hook and the second engagement hook.

In the above configuration, preferably: a pair of third engagement portions is formed at positions on the base end side of the opening of the retainer with respect to the second engagement portion so as to project out from respective side walls on both sides in the retainer width direction; a pair of third engagement hooks, configured so as to be elastically deformable toward an inside in the retainer cover width direction, is formed at the retainer cover; and the third engagement hooks engage with the third engagement portions and restrain movement of the retainer cover member toward the windshield side.

According to the above configuration, movement of the retainer cover member in the width direction with respect to the retainer can also be restrained by the third engagement hooks. This thereby enables a good attachment state of the retainer cover member to be achieved.

A vehicle wiper of a fifth aspect of the present invention is the vehicle wiper of the fourth aspect, wherein a first nozzle member includes a nozzle engagement tab. The nozzle engagement tab is configured so as to extend toward the other side in the width direction of the retainer from the first nozzle member, and so as to be elastically deformable in the retainer width direction. During assembly of the first nozzle member to the retainer, a pair of side walls of the retainer function as guide members for the first nozzle member, thereby enabling ease of assembly to be raised.

A stopper is also formed at the first nozzle member, and the stopper abuts the second engagement portion of the retainer and restrains movement at the first nozzle member toward the leading end side of the wiper arm.

According to the above configuration, in the assembled state of the first nozzle member to the retainer, movement of the first nozzle member toward the retainer leading end side is restrained by the stopper. Thus the stopper functions as a positioner when the first nozzle member is being assembled to the retainer. This thereby enables the ease of assembly of the first nozzle member to be further raised.

A vehicle wiper of a sixth aspect of the present invention is the vehicle wiper of the first aspect, further including: an arm head whose base end portion is fixed to the pivot shaft, and whose leading end portion is coupled to the retainer so as to be capable of swinging; a second nozzle member that is provided at a length direction leading end portion of the retainer, or that is provided at a wiper blade coupled to the length direction leading end portion of the retainer, and that is capable of ejecting washer fluid from an ejection portion onto the opposite side of the wiper blade to that of the first nozzle member; a second hose that is housed inside the retainer and that supplies washer fluid to the second nozzle member; and a conductor wire that is laid out along the second hose, wherein the conductor wire is wound around the second hose at a position corresponding to a coupling portion of the retainer to the arm head.

According to the above configuration, since the conductor wire is laid out along the flexible second hose and is wound around the second hose at a position corresponding to the coupling portion of the retainer to the arm head, a configuration can be achieved in which a large tensile force does not act on the conductor wire when the wiper is in a moveable state, while the conductor wire does not have slack so as to separate from the second hose, even when the wiper is in a non-moveable state.

In the above vehicle wiper, the retainer is capable of being switched between a wiping position aligned along the windshield and a flipped-up position flipped up away from the windshield by the retainer being coupled to the length direction leading end portion of the arm head so as to be capable of swinging about an axis along a direction different to that of the pivot shaft.

According to the above configuration, the conductor wire is wrapped around the second hose at the position corresponding to the coupling portion of the retainer to the arm head, enabling a configuration in which a large tensile force does not act on the conductor wire when the retainer is in the flipped-up position, while still enabling a state in which the conductor wire does not have any slack so as to be separated from the hose, even when the retainer is in the wiping position.

In the above vehicle wiper, preferably a defrosting heater is provided at the second nozzle member, and the conductor wire is a heater conductor wire connected to the heater.

According to the above configuration, due to providing the defrosting heater to the second nozzle member, freezing of washer fluid or the like in the vicinity of the ejection port of the nozzle member can be thawed. The conductor wire is also a heater conductor wire connected to the heater, and so a large tensile force can be suppressed from acting while a slack is prevented in the heater conductor wire.

BRIEF DESCRIPTION OF THE DRAWINGS

Embodiments of the present invention will be described in detail based on the following figures, wherein.

DETAILED DESCRIPTION OF THE INVENTION

Explanation follows of a first exemplary embodiment of a vehicle wiper, with reference to FIG. 1 to FIG. 11.

Figure 1:
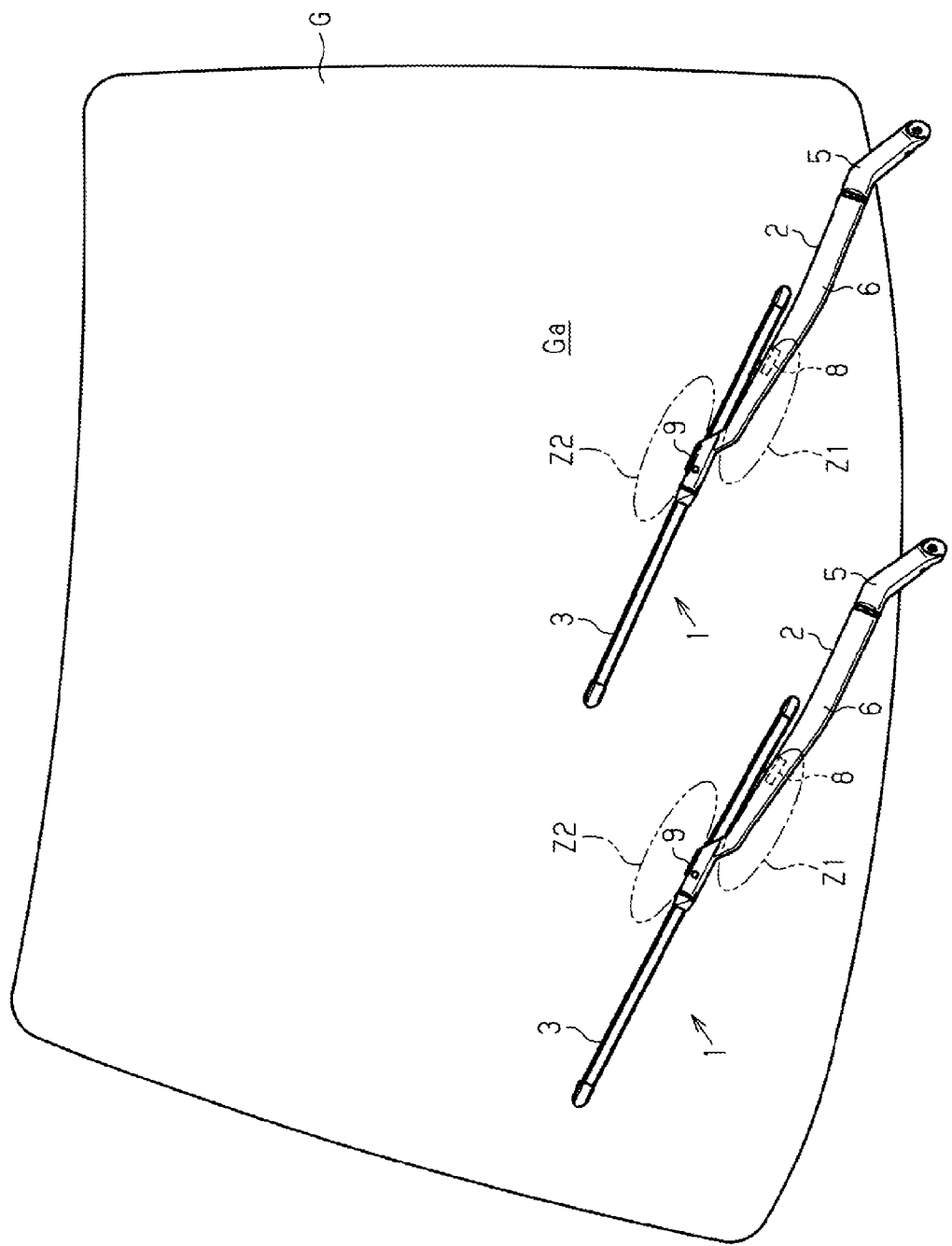
FIG. 1 is a schematic diagram to explain a vehicle wiper of a first exemplary embodiment, and the operation thereof.

As illustrated in FIG. 1, vehicle wipers 1 are respectively provided on a driver seat side (right side in FIG. 1) and on the passenger seat side (the left side in FIG. 1) for wiping a wiping surface Ga of a vehicle windshield glass G on the vehicle cabin outside.

Figure 2:
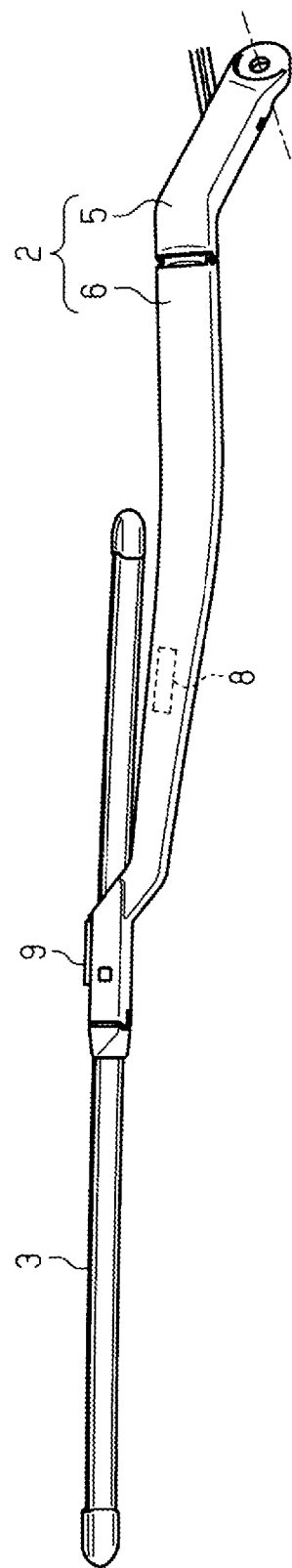
FIG. 2 is a plan view of a vehicle wiper of the first exemplary embodiment.

As illustrated in FIG. 1 and FIG. 2, each of the vehicle wipers 1 is equipped with a wiper arm 2, and a wiper blade 3 coupled to the wiper arm 2.

The wiper arm 2 is fixed to a pivot shaft (not illustrated in the drawings) that is swung to-and-fro by driving force of a non-illustrated motor, that is a forward/reverse rotation controlled motor, and is equipped with an elongated shaped arm head 5 that swings integrally with the pivot shaft. An elongated shaped retainer 6 is coupled to the length direction leading end portion of the arm head 5 so as to be capable of swinging with respect to the pivot shaft axis. The retainer 6 is moreover capable of swinging about an axis lying along a direction different to the pivot shaft. The wiper blade 3 for wiping the surface Ga is coupled to the length direction leading end portion of the retainer 6.

Figure 3:
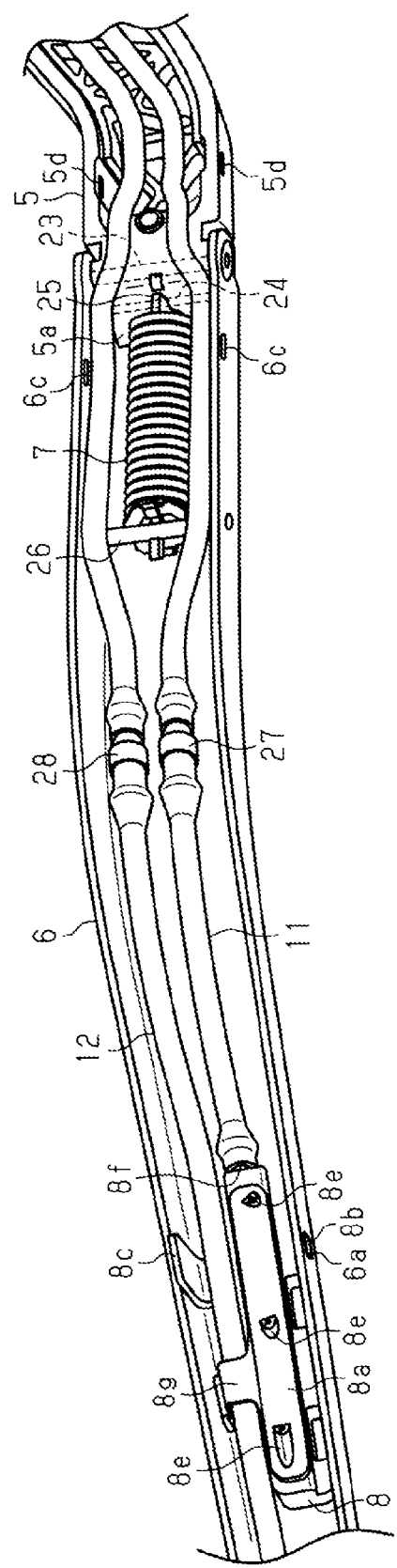
FIG. 3 is a partial perspective view to explain a configuration of a vehicle wiper of the first exemplary embodiment.
Figure 4:
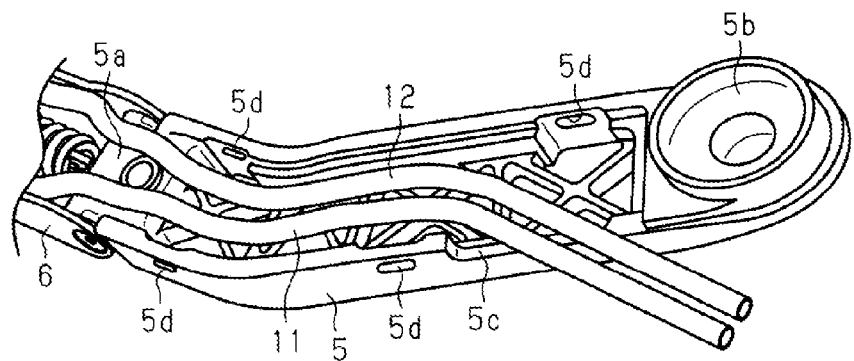
FIG. 4 is a partial perspective view to explain a configuration of a vehicle wiper of the first exemplary embodiment.
Figure 5:
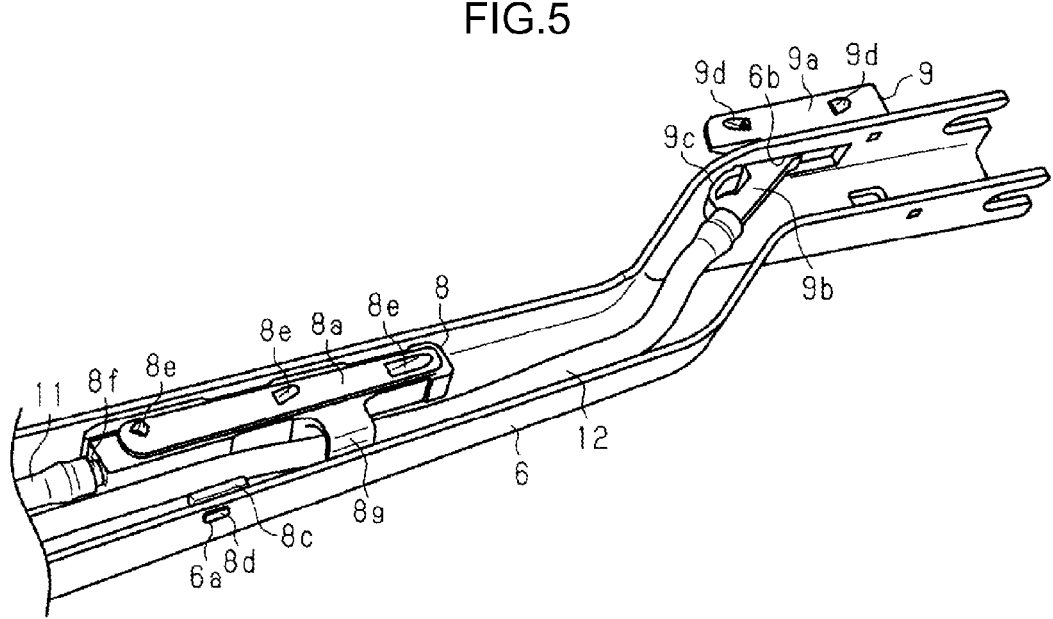
FIG. 5 is a partial perspective view to explain a configuration of a vehicle wiper of the first exemplary embodiment.

As illustrated in FIG. 3 to FIG. 5, the arm head 5 and the retainer 6 are formed in an elongated shaped with substantially angular U-shaped cross-section profiles orthogonal to their length directions, open at the lower side (the back-face sides) facing the wiping surface Ga.

As illustrated in FIG. 3, the vehicle wiper 1 of the present exemplary embodiment is equipped with an urging spring 7 for urging the leading end side of the retainer 6 and the wiper blade 3 toward a wiping surface Ga side, with the urging spring 7 housed inside the length direction base end side of the retainer 6.

As illustrated in FIG. 3 and FIG. 5, the vehicle wiper 1 is equipped with an intermediate nozzle member 8, serving as a first nozzle member, housed inside a length direction intermediate portion of the retainer 6 and capable of ejecting washer fluid from an ejection portion 8a.

The vehicle wiper 1 is equipped with a leading end side nozzle member 9 serving as a second nozzle member and capable of ejecting washer fluid from an ejection portion 9a provided to a length direction leading end portion of the retainer 6.

The vehicle wiper 1 is also equipped with a hose 11 that is housed inside the retainer 6, and serves as a first hose for supplying washer fluid to the intermediate nozzle member 8, and a hose 12 that is housed inside the retainer 6, and serves as a second hose for supplying washer fluid to the leading end side nozzle member 9.

Figure 6:
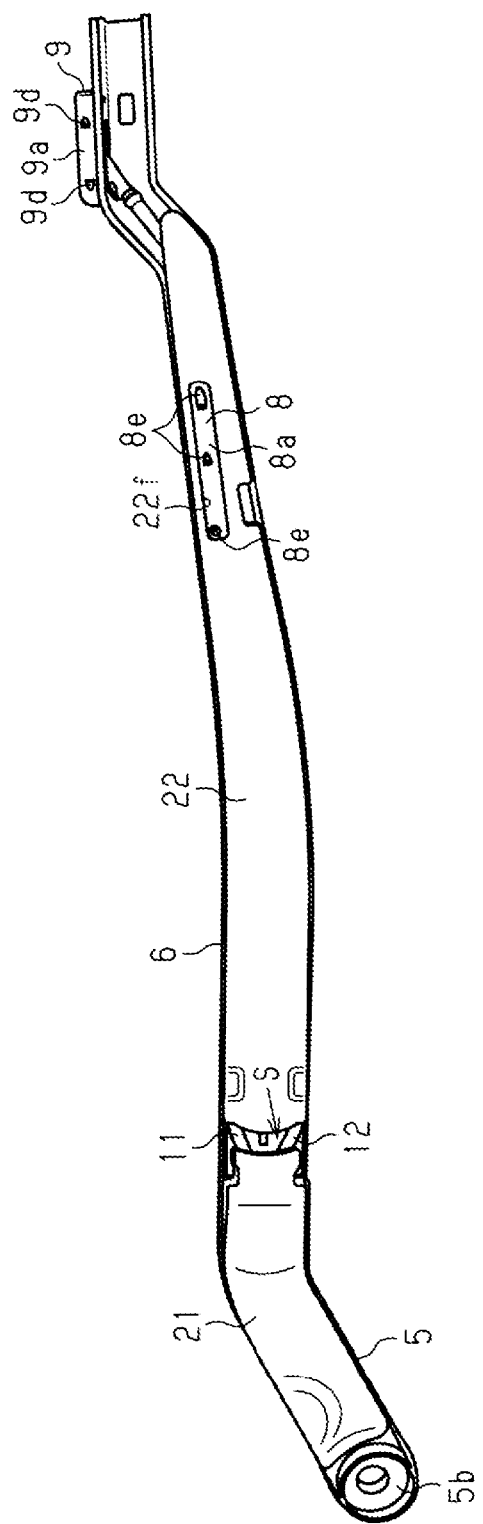
FIG. 6 is bottom view of a wiper arm of the first exemplary embodiment.

As illustrated in FIG. 6, the vehicle wiper 1 of the present exemplary embodiment is equipped with a head cover member 21 that is provided so as to permit relative swing between the arm head 5 and the retainer 6, while closing off the opening of the arm head 5, and a retainer cover member 22 that is provided so as to permit relative swing between the arm head 5 and the retainer 6, while closing off the opening of the retainer 6.

More precisely, as illustrated in FIG. 3, a coupling protrusion 5a is formed at the length direction leading end portion of the arm head 5 so as to be inserted between the two side walls at the length direction base end portion of the retainer 6. A shaft 23 that pierces through the coupling protrusion 5a is supported by the two side walls of the retainer 6 whereby the retainer 6 is coupled so as to be capable of relative swinging with respect to the arm head 5 between a wiping position and a flipped-up position described later.

A pin 24 that is parallel to the shaft 23 is provided embedded, except for at a length direction intermediate portion of the pin 24, in the leading end portion of the coupling protrusion 5a of the arm head 5, and a base end portion of a support bar 25 (see FIG. 8) is coupled to the length direction intermediate portion of the pin 24 so as to be capable of swinging. The leading end portion of the support bar 25 is supported by a pin 26 supported by the two side walls of the retainer 6, and the urging spring 7 is retained in a compressed state fitted over the outside of the support bar 25 such that the leading end side of the retainer 6 (namely the wiper blade 3) is urged toward the wiping surface Ga side with respect to the arm head 5.

As illustrated in FIG. 3 and FIG. 5, a fixing hole 6a is formed in each of the two side walls of a length direction intermediate portion of the retainer 6. The intermediate nozzle member 8 is formed in a substantially rectangular shape with the ejection portion 8a on the wiping surface Ga side, and positioning of the intermediate nozzle member 8 inside the retainer 6 is fixed by a fixing protrusion 8b (see FIG. 10) formed on one side of the intermediate nozzle member 8, and a fixing protrusion 8d of a resilient fixing tab 8c formed on the other side (see FIG. 11), fitting into respective fixing holes 6a. The ejection portion 8a of the intermediate nozzle member 8 of the present exemplary embodiment is formed with a substantially rectangular shaped profile with its length along the length direction of the retainer 6 when viewed from the wiping surface Ga side (from below), and is formed facing toward the wiping surface Ga. Three ejection ports 8e are provided in a row along the length direction of the ejection portion 8a. As illustrated in FIG. 1, in a state in which the intermediate nozzle member 8 (the ejection portion 8a) is installed to a vehicle, the intermediate nozzle member 8 is disposed further to a side at the vehicle wiper 1 return motion direction than the wiper blade 3 (this being the lower side, the home position side), is supplied with washer fluid mainly during the return motion of the vehicle wiper 1, and is employed to eject the supplied washer fluid onto a return motion direction area Z1 of the wiping surface Ga.

As illustrated in FIG. 5, a fixing hole 6b is formed at one side wall at a forward motion direction side of the wiper 1 at the length direction leading end portion of the retainer 6 (further to the leading end side than the intermediate nozzle member 8 of the retainer 6). The leading end side nozzle member 9 is formed with a substantially rectangular shaped profile including the ejection portion 9a, and positioning of the leading end side nozzle member 9 is fixed on the outside of the side wall of the retainer 6 by an installation tube 9b provided so as to extend to one side, and a resilient tab 9c formed at the installation tube 9b, fitting into the fixing hole 6b. Two ejection ports 9d are provided at the ejection portion 9a of the leading end side nozzle member 9 in a row along the length direction of the retainer 6. As illustrated in FIG. 1, in an installed state to a vehicle, the leading end side nozzle member 9 (ejection portion 9a) is disposed further to the forward motion direction side of the vehicle wiper 1 than the wiper blade 3 (the upper side, the wiping finish end side, namely the opposite side of the wiper blade 3 to the intermediate nozzle member 8), is supplied with washer fluid mainly during forward motion of the vehicle wiper 1, and is employed to eject the supplied washer fluid onto a forward motion direction area Z2 of the wiping surface Ga.

As illustrated in FIG. 3 and FIG. 5, an installation tube 8f is formed at a length direction base end portion of the intermediate nozzle member 8. The hose 11 which is housed inside the arm head 5 and spans across to the retainer 6 so as to be housed inside the retainer 6 is connected to the installation tube 8f. More specifically, the hose 11 is laid out from a non-illustrated washer pump to the base end portion of the arm head 5, laid out and housed inside the arm head 5 from the base end portion of the arm head 5 up to the leading end portion of the arm head 5, is laid out so as to span across to the retainer 6 and housed inside the retainer 6 from the base end portion of the retainer 6 up to the intermediate nozzle member 8, and is connected to the installation tube 8f. The hose 11 is laid out so as to pass inside the retainer 6 between the urging spring 7 and one side wall of the retainer 6. The hose 11 of the present exemplary embodiment is divided at a position between the intermediate nozzle member 8 and the urging spring 7, and the separate parts are connected together by a check valve 27 for preventing air from flowing from the intermediate nozzle member 8 into the hose 11.

As illustrated in FIG. 3 and FIG. 5, the hose 12, which is housed inside the arm head 5 and spans across to the retainer 6 and housed inside the retainer 6, is connected to the installation tube 9b of the leading end side nozzle member 9. More specifically, the hose 12 is laid out from a non-illustrated washer pump to a base end portion of the arm head 5, is laid out and housed inside the arm head 5 from the base end portion to the leading end portion of the arm head 5, spans across to the retainer 6 so as to be laid out and housed inside the retainer 6 from the base end portion of the retainer 6 to the leading end side nozzle member 9, and is connected to the installation tube 9b. The hose 12 is laid out inside the retainer 6 so as to pass between the urging spring 7 and the other side wall of the retainer 6, and is laid out so as to pass between the intermediate nozzle member 8 and the other side wall of the retainer 6. Similar to the hose 11, the hose 12 of the present exemplary embodiment is divided at a position between the intermediate nozzle member 8 and the urging spring 7, and the separate parts are connected together by a check valve 28 for preventing air from flowing from the leading end side nozzle member 9 into the hose 12.

The resilient fixing tab 8c of the intermediate nozzle member 8 (see FIG. 3, FIG. 5, and FIG. 11) is formed curving so as to cover an opposite side to the wiping surface Ga side (the opening-bottom side of the retainer 6) of the hose 12 that is connected to the leading end side nozzle member 9, and configures a portion of a hose restricting section that restricts flapping of the hose 12. A hose restricting tab 8g is also formed at a position displaced from the resilient fixing tab 8*c* in the length direction of the intermediate nozzle member 8, curving so as to cover the wiping surface Ga side of the hose 12, and configuring a portion of the hose restricting section that restricts flapping of the hose 12. Namely, the resilient fixing tab 8*c* and the hose restricting tab 8*g* configuring the hose restricting section are provided on opposite sides and at positions displaced in the length direction to each other so as to clamp either side of the hose 12, and restrict flapping of the hose 12.

As illustrated in FIG. 6, the sheet shaped head cover member 21 made from resin is assembled to the opening of the arm head 5 such that the hoses 11, 12 housed inside the arm head 5 are not visible from the wiping surface Ga side (from the cabin inside during wiping action).

Figure 7:
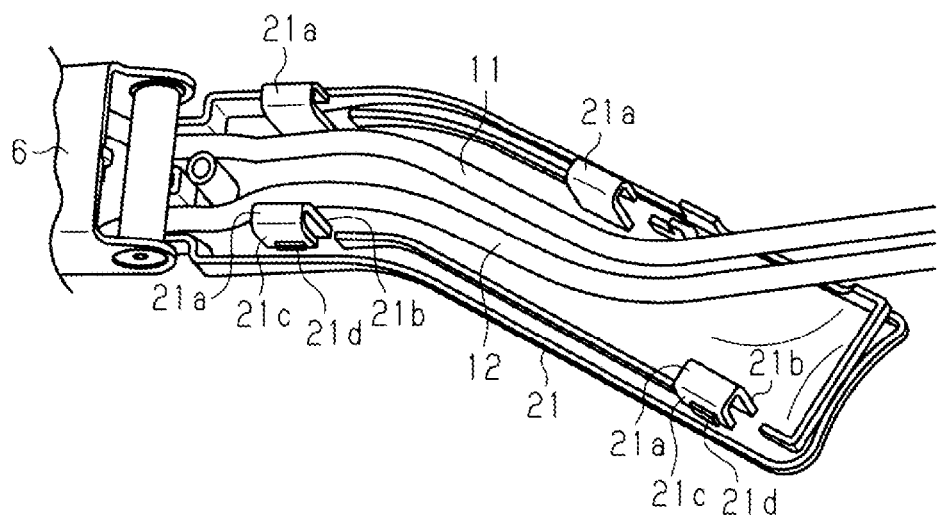
FIG. 7 is partial perspective view to explain a configuration of a vehicle wiper of the first exemplary embodiment.

More specifically, as illustrated in FIG. 4, the arm head 5 includes a shaft fixing portion 5*b* for fixing the base end portion of the arm head 5 itself to a pivot shaft, and the arm head 5, for the most part, has a substantially angular U-shaped cross-section profile orthogonal to the length direction, except for at the shaft fixing portion 5*b*, and is formed with an elongated shaped open at the lower side facing toward the wiping surface Ga (the back face side). A cutout 5*c* is formed at a side wall of the base end side of the arm head 5 for installing the hoses 11, 12 inside the arm head 5. Engaged fixing holes 5*d*, serving as engaged fixing portions, are respectively formed to both side walls at the length direction leading end side and at the length direction base end side of the arm head 5. As illustrated in FIG. 7, the head cover member 21 includes resilient engagement fixing portions 21*a* that engage with each of the engaged fixing holes 5*d*, and the resilient engagement fixing portions 21*a* are assembled to the arm head 5 by engaging with the engaged fixing holes 5*d*. The resilient engagement fixing portions 21*a* each includes a first resilient tab 21*b* that projects out in the assembly direction (in the direction opposite to the wiping surface Ga direction), a second resilient tab 21*c* that curves around from the leading end portion of the first resilient tab 21*b* toward the width direction outside and extends back on itself (in the wiping surface Ga direction), and an engaging fixing portion 21*d* that is provided at the leading end portion of each of the second resilient tabs 21*c* so as to engage by fitting into the respective engaged fixing holes 5*d*.

Moreover, as illustrated in FIG. 6, the sheet shaped retainer cover member 22 made from resin is assembled to the opening of the retainer 6 such that the hoses 11, 12 housed inside the retainer 6 are not visible from the wiping surface Ga side (from the cabin inside during wiping action).

More specifically, as illustrated in FIG. 3, first, engaged holes 6*c* are formed as an engaged portion to both respective side walls at the length direction base end side of the retainer 6.

Figure 8:
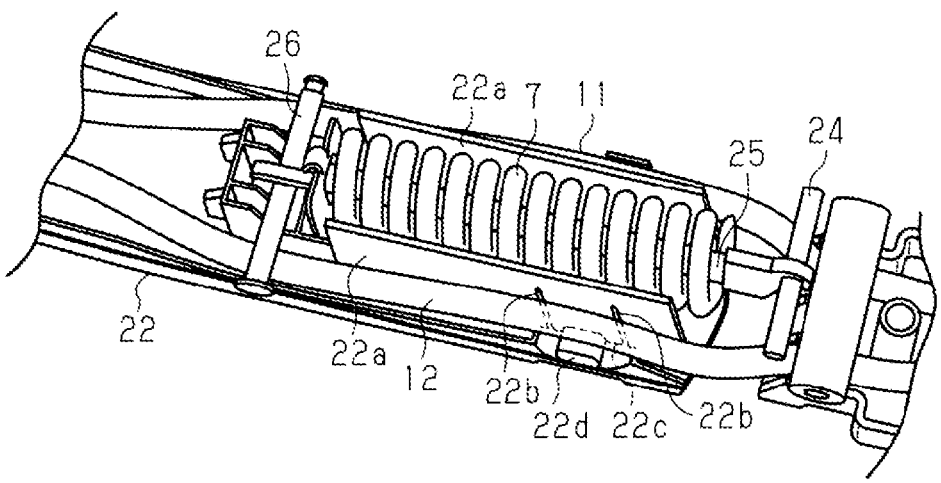
FIG. 8 is partial perspective view to explain a configuration of a vehicle wiper of the first exemplary embodiment.
Figure 9:
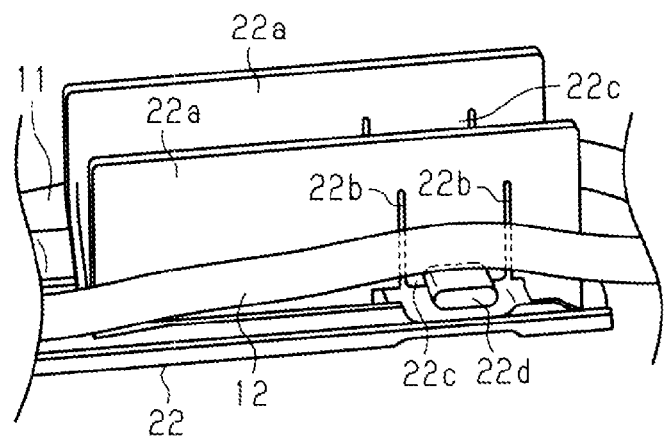
FIG. 9 is partial perspective view to explain a configuration of a vehicle wiper of the first exemplary embodiment.

Moreover, as illustrated in FIG. 8 and FIG. 9, partitioning walls 22*a* are provided at the retainer cover member 22 so as to project out in the assembly direction (the opposite direction to the wiping surface Ga direction) and to interpose between the urging spring 7 and the hoses 11, 12. In other words, the partitioning walls 22*a* are provided projecting out so as to partition the retainer cover member 22 into an area in which the urging spring 7 is disposed, and an area in which the hoses 11, 12 are disposed. In the present exemplary embodiment, the two hoses 11, 12 are provided side-by-side along the length direction of the retainer 6, and are respectively disposed on either side of the urging spring 7, with the partitioning walls 22*a* respectively formed on either side of the urging spring 7. By forming a slit 22*b* in a portion of each of the partitioning walls 22*a*, a resilient tab 22*c* is configured so as to be capable of flexing in the width direction, which is a direction orthogonal to the projection direction of the partitioning walls 22*a*. Engaging portions 22*d* that engage by fitting into the respective engaged holes 6*c* of the retainer 6 are formed at the leading end portions of the resilient tabs 22*c*, so as to extend toward the width direction outside. The retainer cover member 22 is thereby assembled by the engaging portions 22*d* engaging with the engaged holes 6*c* at the length direction base end side of the retainer 6.

Figure 10:
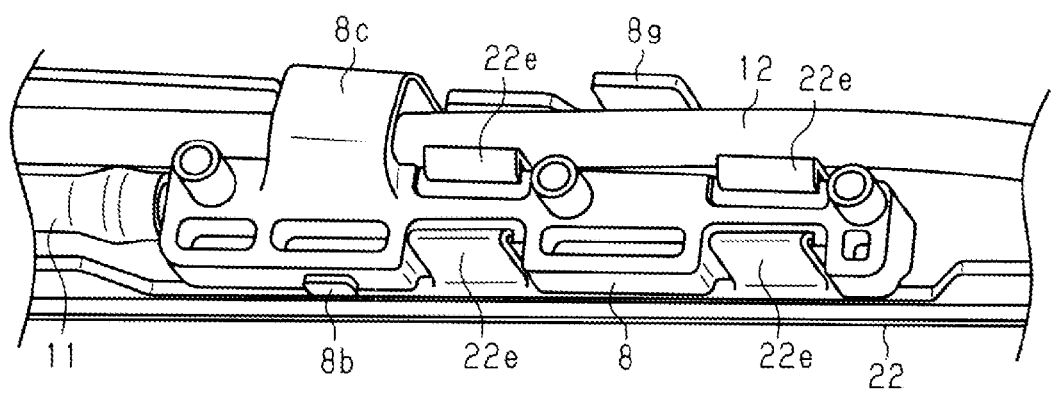
FIG. 10 is partial perspective view to explain a configuration of a vehicle wiper of the first exemplary embodiment.
Figure 11:
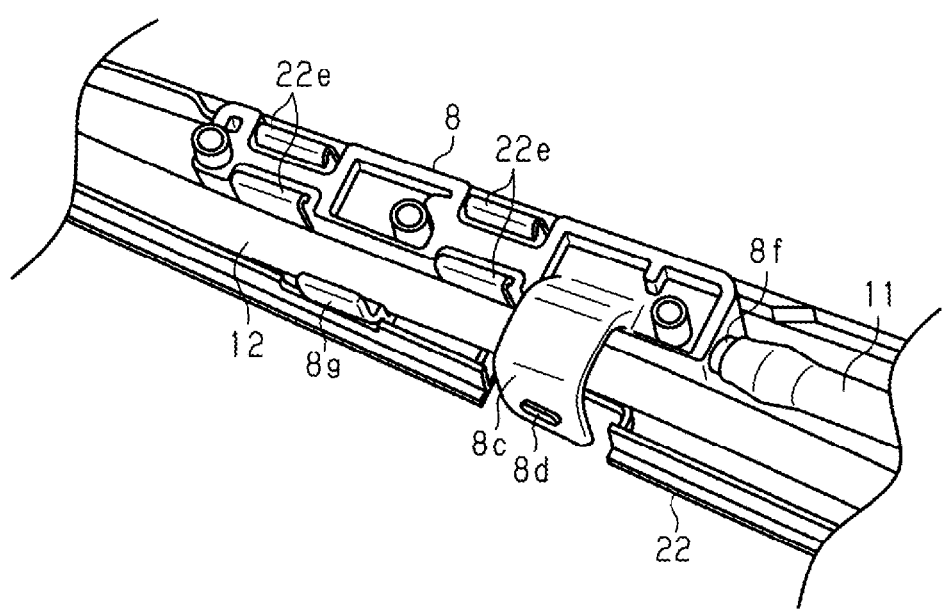
FIG. 11 is partial perspective view to explain a configuration of a vehicle wiper of the first exemplary embodiment.

The length direction leading end side of retainer cover member 22 of the present exemplary embodiment is fixed to the intermediate nozzle member 8 that is fixed in position to the retainer 6. Namely, as illustrated in FIG. 10 and FIG. 11, the retainer cover member 22 includes four retaining hook tabs 22*e* that are formed projecting out along the assembly direction (the opposite direction to the wiping surface Ga direction) and formed with hooks at leading end portions thereof, and the retaining hook tabs 22*e* are fixed to the intermediate nozzle member 8 so as to grip the intermediate nozzle member 8.

As illustrated in FIG. 6, when the arm head 5 and the retainer 6 are positioned in a substantially straight line when viewed from the side thereof, the head cover member 21 and the retainer cover member 22 are provided with a spacing S formed between the length direction leading end portion of the head cover member 21 and the length direction base end portion of the retainer cover member 22. Due to the spacing S, collision between the head cover member 21 and the retainer cover member 22 is avoided even when the leading end side of the retainer 6 swings toward the wiping surface Ga side with respect to the arm head 5 when the retainer 6 is disposed at the wiping position. Since the head cover member 21 and the retainer cover member 22 are separated to each other at a location where of the axis 23 which couple the arm head 5 and the retainer 6 together, the leading end side of the retainer 6 can swing toward the opposite side (the flipped-up position side) to the wiping surface Ga side. Namely, the relative swing between the arm head 5 and the retainer 6 are enabled.

A window 22*f* is formed as an opening to the retainer cover member 22 so as to externally expose the ejection portion 8*a* of the intermediate nozzle member 8. The retainer cover member 22 closes off the opening of the retainer 6 using a single member. The window 22*f* in the present exemplary embodiment has a similar shape to that of the ejection portion 8*a* when viewed from the wiping surface Ga side (from below), and is configured by an elongated hole into which the exposed locations of the ejection portion 8*a* fit. The ejection portion 8*a* is formed so as to be flush with the front face of the retainer cover member 22 on the wiping surface Ga side in a state in which the ejection portion 8*a* has been fitted into the window 22*f* (a state in which all the members have been assembled).

Explanation follows regarding operation of the vehicle wiper 1 configured as described above.

When a washer switch provided at the driver seat is operated, the pivot shaft is swung to-and-fro by the driving force of the motor, and the vehicle wiper 1 is swung to-and-fro (oscillated). Washer fluid is supplied from the washer pump to the leading end side nozzle member 9 through the hose 12 during the forward motion of the vehicle wiper 1, and washer fluid is ejected onto the forward motion direction area Z2 from the ejection portion 9*a* (the ejection ports 9*d*) of the leading end side nozzle member 9. Washer fluid is supplied from the washer pump to the intermediate nozzle member 8 through the hose 11 during the return motion of the vehicle wiper 1, and washer fluid is ejected onto the return motion direction area Z1 from the ejection portion 8a (the ejection ports 8e) of the intermediate nozzle member 8. Thus the wiping surface Ga onto which the washer fluid has been ejected during the forward motion and during the return motion, is quickly wiped by the wiper blade 3 of the vehicle wiper 1, cleaning of the wiping surface Ga excellently.

The following is a list of characteristic advantageous effects of the above exemplary embodiment.

(1) Even with the opening of the retainer 6 closed off by the retainer cover member 22, it is still possible to externally expose the ejection portion 8a of the intermediate nozzle member 8 disposed inside the retainer 6 from the window 22f of the retainer cover member 22, and to eject washer fluid from the opening side of the retainer 6. This thereby enables washer fluid to be ejected from the ejection portion 8a of the intermediate nozzle member 8 without having a detrimental effect on the styling of the vehicle wiper 1.

(2) Due to the partitioning walls 22a being provided at the retainer cover member 22 so as to project out between the urging spring 7 and the hoses 11, 12 in order to partition between the urging spring 7 and the hoses 11, 12, the hoses 11, 12 can be prevented from contacting the urging spring 7. This thereby enables damage to hoses 11, 12 to be suppressed.

(3) The two hoses 11, 12 are provided side-by-side along the length direction of the retainer 6, and are respectively disposed on either side of the urging spring 7, with the partitioning walls 22a respectively formed on either side of the urging spring 7. Thus the hoses 11, 12 can be prevented from contacting the urging spring 7, while the urging spring 7 is disposed at the width direction center and urges the retainer 6 with good balance.

(4) By forming the slit 22b in a portion of each of the partitioning walls 22a, the resilient tab 22c is configured so as to be capable of flexing in the width direction, which is a direction orthogonal to the projection direction of the partitioning walls 22a, and engaging portions 22d that engage by fitting into the respective engaged holes 6c of the retainer 6 are formed at the leading end portions of the resilient tabs 22c, so as to extend toward the width direction outside. This thereby enables the retainer cover member 22 to be assembled to the retainer 6 by employing the portions of the partitioning walls 22a that serve as the resilient tabs 22c. Namely, the structure is simplified because the resilient tabs 22c are formed at portions of the partitioning walls 22a, compared to cases in which separated resilient tabs are formed at the retainer cover member 22 at other positions, and the engaging portions 22d are formed to these resilient tabs. At locations on the length direction base end side of the retainer 6 where space is limited due to forming the partitioning walls 22a, the resilient tabs 22c and the engaging portions 22d are provided, this thereby enabling the length direction base end side of the retainer cover member 22 to engage with the retainer 6, and the retainer cover member 22 to be firmly fixed to the retainer 6.

(5) In the intermediate nozzle member 8, flapping of the hose 12 can be restricted without increasing the number of components, due to forming the hose restricting section (the resilient fixing tab 8c and the hose restricting tab 8g) to restrict flapping of the hose 12 that supplies washer fluid to the leading end side nozzle member 9.

(6) Due to the intermediate nozzle member 8 being fixed in position to the retainer 6, the washer fluid ejecting direction can be stabilized with higher precision than in cases in which the intermediate nozzle member 8 is fixed in position to the molded retainer cover member 22 of lower rigidity.

(7) The resilient fixing tab 8c is formed at the intermediate nozzle member 8 for fixing the position of the intermediate nozzle member 8 itself to the retainer 6, and the hose restricting section includes the resilient fixing tab 8c. This thereby enables flapping of the hose 12 to be suppressed using the resilient fixing tab 8c. Namely, the resilient fixing tab 8c and (a portion of) the hose restricting section are formed in a common component, this thereby enables the intermediate nozzle member 8 to be made more compact than in cases in which a hose restricting section is formed separately at another portion of the intermediate nozzle member 8.

(8) Due to the length direction leading end side of the retainer cover member 22 being fixed to the intermediate nozzle member 8, there is no need to form a fixing hole or the like for fixing the retainer cover member 22 in the retainer 6, enabling a detrimental effect on the external appearance of the retainer 6 to be avoided.

(9) The hose 11 for supplying washer fluid to the intermediate nozzle member 8 is housed inside the arm head 5, and also spans across to the retainer 6 and is housed inside the retainer 6. The head cover member 21 is provided so as to close off the opening of the arm head 5 and also to permit relative swinging between the arm head 5 and the retainer 6, and the retainer cover member 22 is provided so as to close off the opening of the retainer 6 and also to permit relative swinging between the arm head 5 and the retainer 6. In other words, the head cover member 21 and the retainer cover member 22 are separated from each other at the position of the shaft 23 that couples the arm head 5 and the retainer 6 together. This thereby enables the hose 11 to be laid out in a state that is not substantially visible from the outside, without impeding relative swinging of the retainer 6 with respect to the arm head 5. In the present exemplary embodiment, the hose 12 for supplying washer fluid to the leading end side nozzle member 9 may also be laid out in a state that is not substantially visible from the outside.

(10) The resilient engagement fixing portions 21a each include the first resilient tab 21b that is provided projecting out along the assembly direction, the second resilient tab 21c that extends from the leading end portion of the first resilient tab 21b so as to fold back on itself, and the engaging fixing portion 21d that is provided at the leading end portion of the second resilient tab 21c and engages with the respective engaged fixing hole 5d. This thereby enables a large elastic displacement amount of the engaging fixing portion 21d to be achieved, while suppressing the height to a small amount in the projection direction. In other words, the leading end side of the first resilient tab 21b flexes with the base end portion of the first resilient tab 21b acting as a fulcrum, and the leading end side of the second resilient tab 21c flexes with the base end portion of the second resilient tab 21c (the leading end portion of the first resilient tab 21b) acting as a fulcrum. This thereby enables the height of the resilient engagement fixing portions 21a in the projection direction to be suppressed by the second resilient tab 21c extending by folding back on itself, while still achieving a large elastic displacement amount of the engaging fixing portion 21d. Thus not only is easy assembly possible due to the large elastic displacement amount of the engaging fixing portion 21d, but the arm head 5 may be made thinner due to suppressing the height of the resilient engagement fixing portions 21a in the projection direction.

The following modifications may be made to the above exemplary embodiment.

In the above exemplary embodiment, the partitioning walls 22a are provided to the retainer cover member 22 and project out between the urging spring 7 and the hoses 11, 12, however there is no limitation thereto, and modification may be made to a retainer cover member 22 that is not formed with the partitioning walls 22a.

In the above exemplary embodiment, the vehicle wiper 1 equipped with the leading end side nozzle member 9 was employed, however there is no limitation thereto, and a vehicle wiper 1 not equipped with the leading end side nozzle member 9 may be employed. The leading end side nozzle member 9 may also be one that is provided at the wiper blade 3.

In the above exemplary embodiment, the two hoses 11, 12 are disposed on either side of the urging spring 7, respectively, and the partitioning walls 22a are each formed on either side of the urging spring 7, however there is no limitation thereto. The two hoses 11, 12 may be collected together and disposed on one side of the urging spring 7.

In the above exemplary embodiment, portions of the partitioning walls 22a configure the resilient tabs 22c by forming the slits 22b, and so engaging portions 22d that engage with the engaged holes 6c of the retainer 6 are respectively formed at the leading end portions of the resilient tabs 22c. However, there is no limitation thereto, and the retainer cover member 22 may be fixed to the retainer 6 using another configuration.

In the above exemplary embodiment, the hose restricting section (the resilient fixing tab 8c and the hose restricting tab 8g) that restricts flapping of the hose 12 for supplying the washer fluid to the leading end side nozzle member 9 is formed at the intermediate nozzle member 8. However, there is no limitation thereto, and the intermediate nozzle member 8 may be employed that is not formed with the hose restricting section. Moreover, the resilient fixing tab 8c for fixing the position of the intermediate nozzle member 8 to the retainer 6 is commonly used as a portion of the hose restricting section. However, there is no limitation thereto, and a hose restricting section may be provided separately to the resilient fixing tab 8c.

In the above exemplary embodiment, the intermediate nozzle member 8 is fixed in position to the retainer 6. However, there is no limitation thereto, and the intermediate nozzle member 8 may be fixed in position to the retainer cover member 22. In the above exemplary embodiment, the retainer cover member 22 (the length direction leading end side thereof) is fixed to the intermediate nozzle member 8 that is fixed in position to the retainer 6. However, there is no limitation thereto, and, for example, the length direction leading end side of the retainer cover member 22 may be directly fixed to the retainer 6.

In the above exemplary embodiment, the hose 11 for supplying washer fluid to the intermediate nozzle member 8, and the hose 12 for supplying washer fluid to the leading end side nozzle member 9, are housed inside the arm head 5, and span across to the retainer 6 and are housed in the retainer 6. However, there is no limitation thereto, and, for example, configuration may be made such that the hoses 11, 12 are not housed in the arm head 5 when the length of the arm head is short.

In the above exemplary embodiment, the resilient engagement fixing portions 21a of the head cover member 21 are configured with the first resilient tab 21b, the second resilient tab 21c, and the engaging fixing portion 21d. However, there is no limitation thereto, and the head cover member 21 may be fixed to the arm head 5 using another configuration. Moreover, a resilient engagement fixing portion 21a may be provided at the retainer cover member 22 and fixed to the retainer 6.

In the above exemplary embodiment, the window 22f of the retainer cover member 22 is an elongated hole. However, the window 22f may be modified to another shape as long as the ejection portion 8a of the intermediate nozzle member 8 can be externally exposed.

Figure 13:
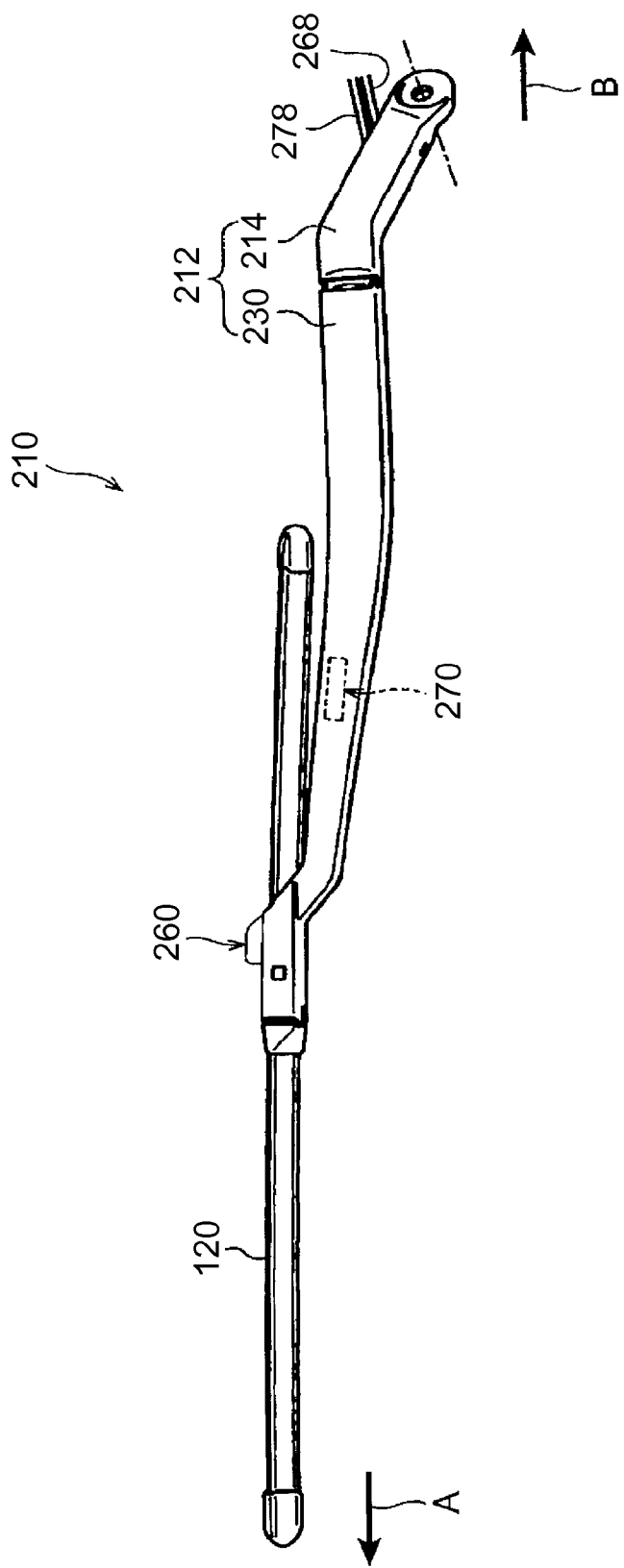
FIG. 13 is plan view of a vehicle wiper according to the second exemplary embodiment, as viewed from the arm upper side.
Figure 14:
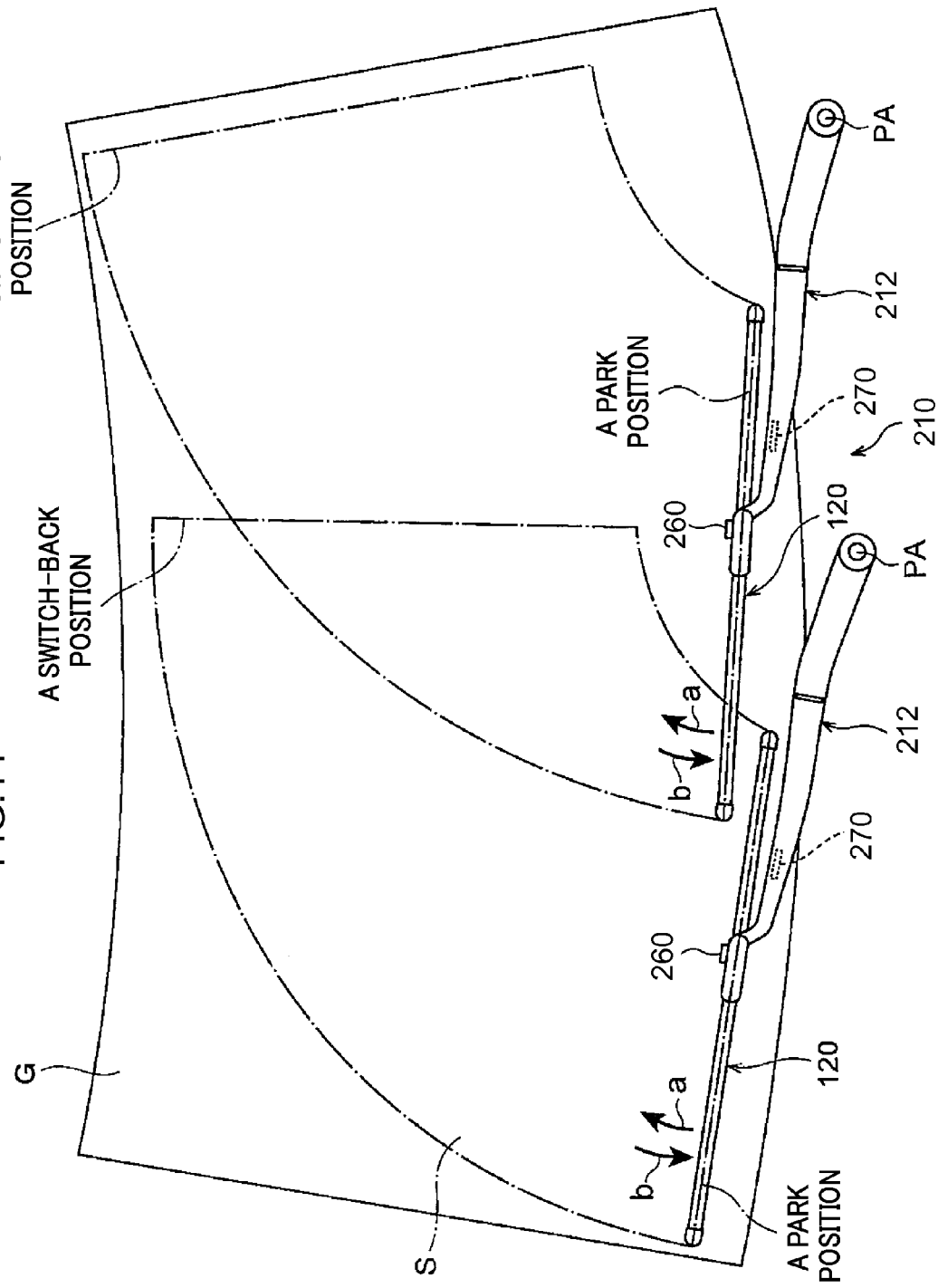
FIG. 14 is a plan view to explain swinging of the wiper arm illustrated in FIG. 13, as seen from outside the wiping surface of a windshield.

Explanation follows regarding a vehicle wiper 210 according to a second exemplary embodiment of the present invention, with reference to the drawings. As illustrated in FIG. 13 and FIG. 14, the vehicle wiper 210 is configured including a wiper arm 212 that is formed in a substantially elongated shape, and a wiper blade 120 that has a substantially elongated shape and that is coupled to a leading end portion of the wiper arm 212. A wiping surface S of a windshield glass G of a vehicle is wiped by swinging the wiper arm 212. Explanation follows mainly regarding a configuration of the wiper arm 212 of the vehicle wiper 210.

Wiper Arm 212

Figure 15:
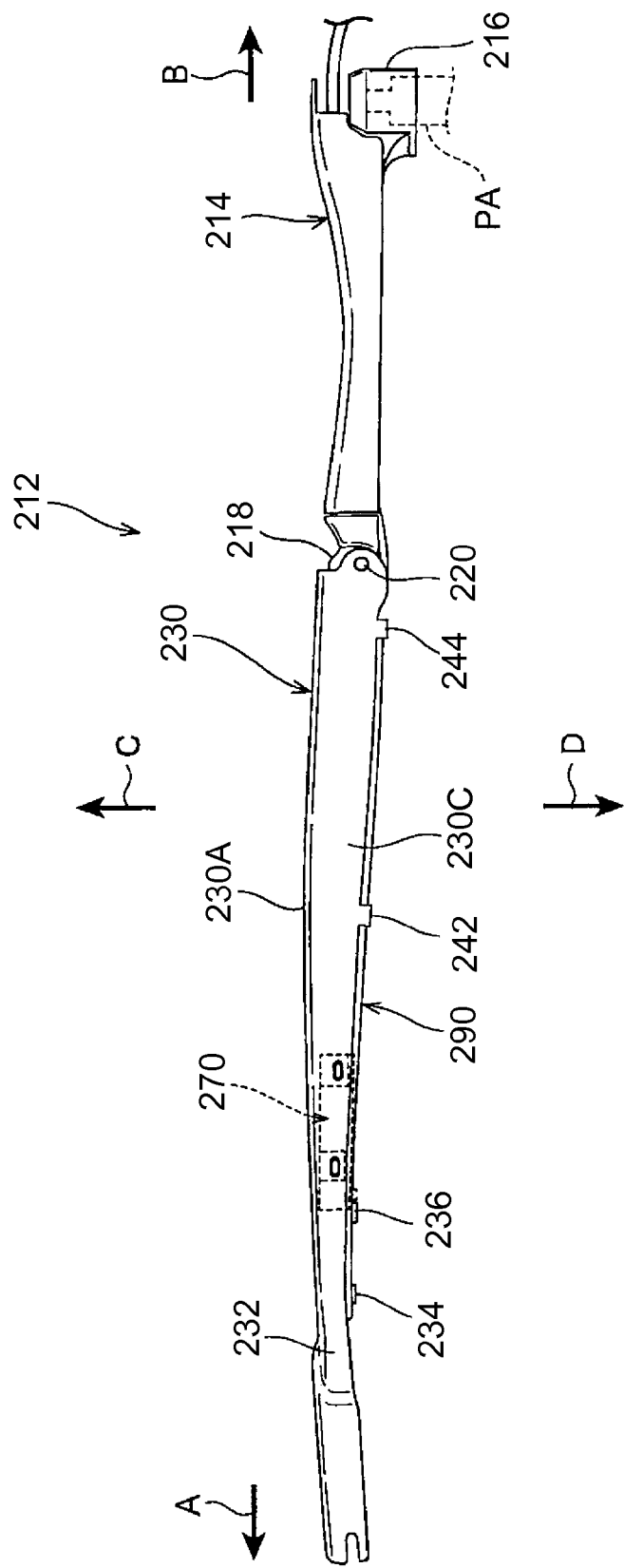
FIG. 15 is a side view illustrating the wiper arm illustrated in FIG. 14.
Figure 16:
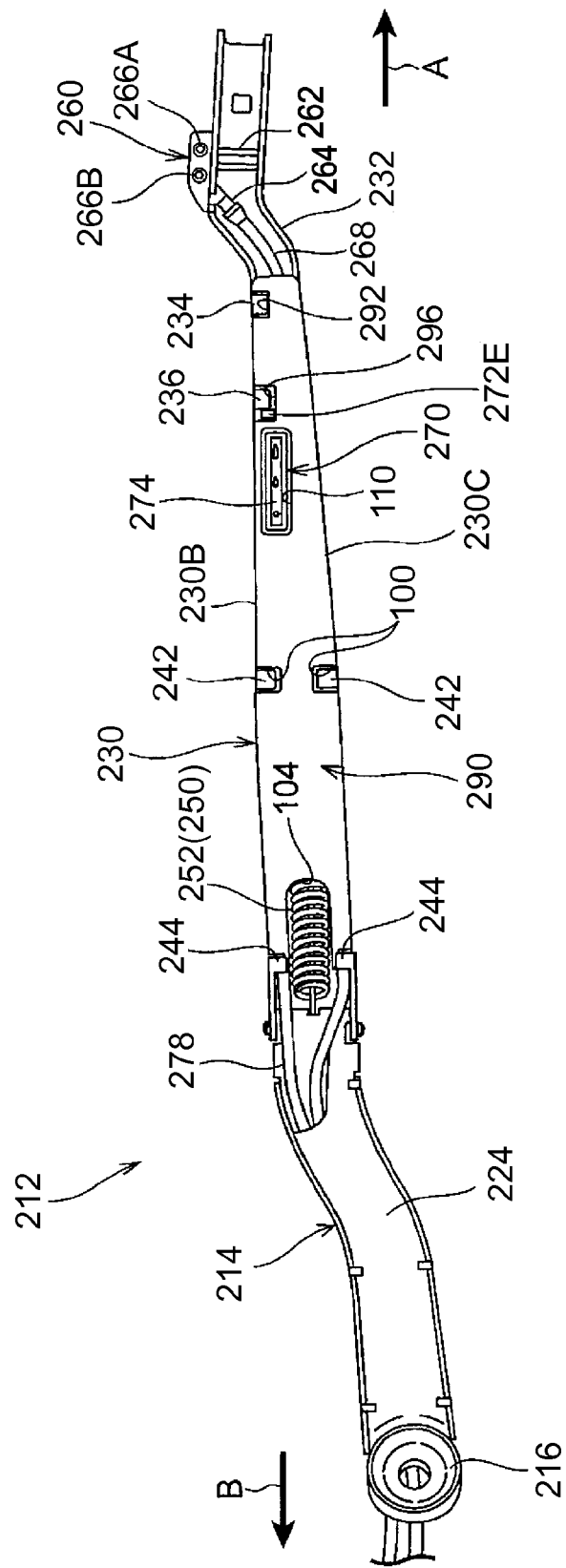
FIG. 16 is a back face view illustrating the wiper arm illustrated in FIG. 13, as viewed from the arm lower side.

As illustrated in FIG. 15 and FIG. 16, the wiper arm 212 is formed in a substantially elongated shape, and is disposed facing the windshield glass G in the thickness direction (a direction orthogonal to the wiping surface S, the arrow C direction and the arrow D direction in FIG. 5) of the windshield glass G (not illustrated in the drawings in FIG. 15 and FIG. 16). In the following explanation, one length direction side of the wiper arm 212 (the arrow A direction side illustrated in FIG. 15 and FIG. 16) is referred to as the arm leading end side, and the other length direction side of the wiper arm 212 (the arrow B direction side illustrated in FIG. 15 and FIG. 16) is referred to as the arm based end side. The opposite side of the wiper arm 212 to the windshield glass G (the arrow C direction side illustrated in FIG. 15) is the arm upper side, and the windshield glass G side (arrow D direction side illustrated in FIG. 15) of the wiper arm 212 is the arm lower side.

The wiper arm 212 is configured including an arm head 214 configuring a portion at the base end side of the wiper arm 212, and a retainer 230 configuring a portion at the leading end side of the wiper arm 212. A leading end side nozzle member 260 is attached as a second nozzle member to a leading end portion of the retainer 230 (see FIG. 16), and an intermediate nozzle member 270 is attached as a first nozzle member to a length direction intermediate portion of the retainer 230 (see FIG. 16). Namely, the wiper arm 212 is configured as a nozzle-attached wiper arm. Moreover, the wiper arm 212 is also equipped with a retainer cover member 290 that closes off an opening in the retainer 230.

Arm Head 214

The arm head 214 is formed with a substantially elongated shape, and is formed with an indented shape open toward the windshield glass G side as viewed from the leading end side. A fixing portion 216 is formed at a base end portion of the arm head 214, and a leading end portion of a substantially circular column shaped pivot shaft PA (see FIG. 15) is fastened and fixed to the fixing portion 216. The pivot shaft PA is supported by a pivot holder (not illustrated in the drawings) that is fixed to a vehicle frame or the like so as to be capable of swinging, and is coupled to a wiper motor (not illustrated in the drawings) through a link mechanism or the like. The wiper arm 212 swings to-and-fro between a park position and a switch-back position, as illustrated in FIG. 14, due to the pivot shaft PA being swung to-and-fro by driving force of the wiper motor. One swing direction side of the wiper arm 212 is the direction from the park position toward the switch-back position (the arrow a direction in FIG. 14) and another swing direction side is the direction from the switch-back position toward the park position (the arrow b direction in FIG. 14).

Figure 17A:
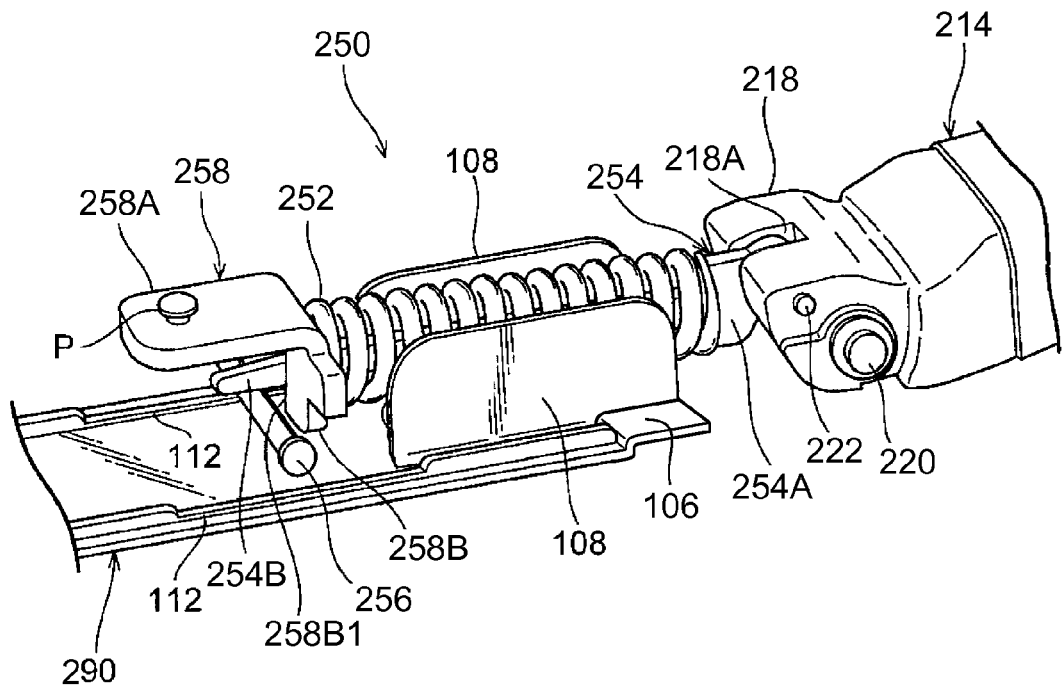
FIG. 17A is a perspective view illustrating a state in which the urging mechanism is coupled to the head side coupling portion of the arm head illustrated in FIG. 15.

As illustrated in FIG. 17A, a head side coupling portion 218 for coupling the retainer 230, described below, to the arm head 214 is formed to the leading end portion of the arm head 214. For convenience of description, the retainer 230 is omitted from illustration in FIG. 17A. A coupling shaft 220 is provided piercing through the head side coupling portion 218 with its axial direction along the width direction of the arm head 214. A support shaft 222 for supporting a spring guide 254, described below, is embedded in a leading end portion of the head side coupling portion 218, at a position on the arm leading end side and arm upper side of the coupling shaft 220. The support shaft 222 is disposed with its axial direction along the width direction of the arm head 214, and parallel to the coupling shaft 220. A slit 218A is formed in a width direction central portion of the leading end portion of the head side coupling portion 218 so as to pierce through the head side coupling portion 218 along the arm up-down direction, and the slit 218A is open toward the leading end side of the arm head 214. A length direction intermediate portion of the support shaft 222 is disposed inside the slit 218A in an exposed state, and the spring guide 254 is supported inside the slit 218A so as to be capable of swinging. A head cover member 224 (see FIG. 16) to close off an opening of the arm head 214 is attached to the arm head 214.

Retainer 230

Figure 12:
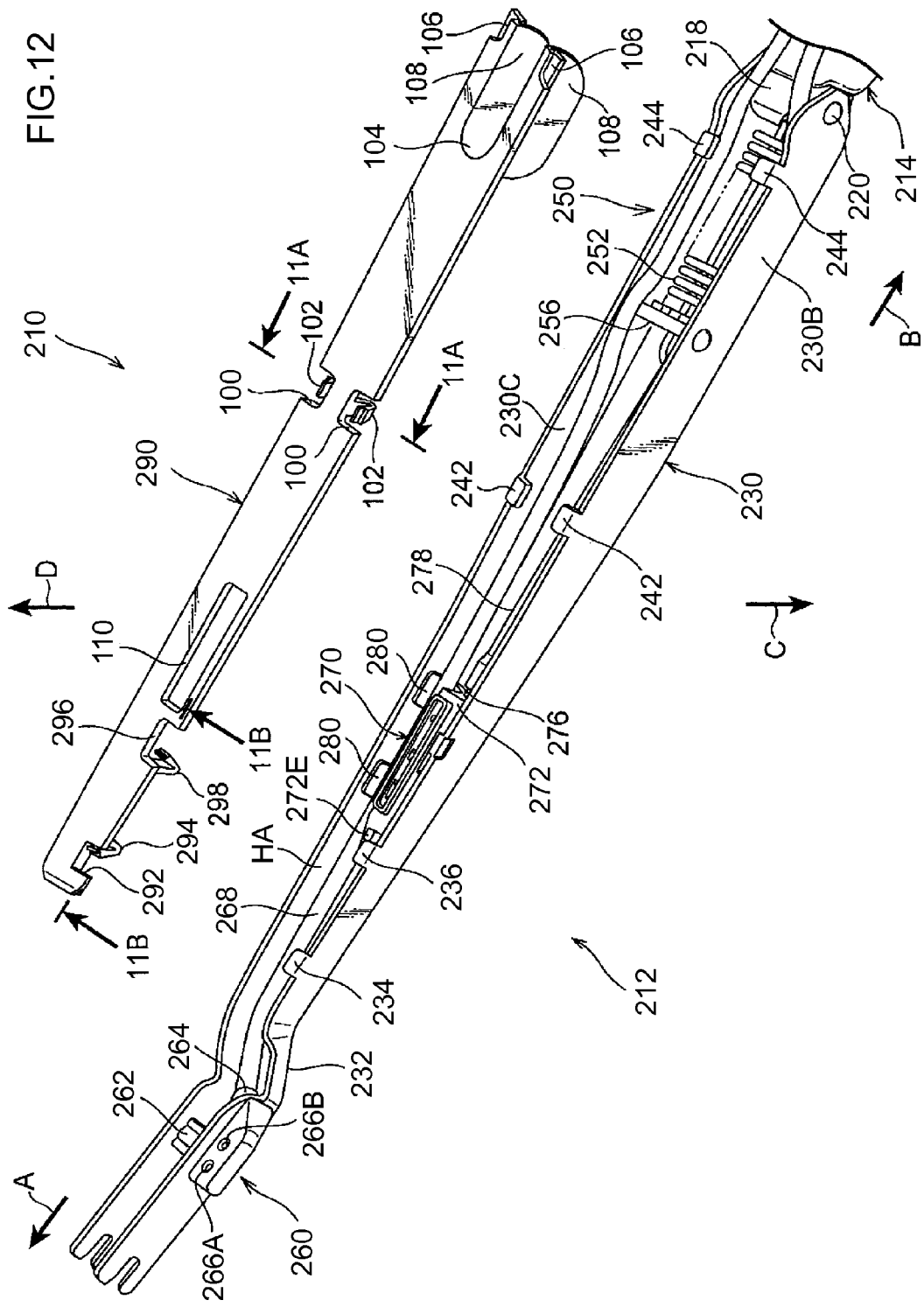
FIG. 12 is an exploded perspective view of a retainer cover employed in a vehicle wiper according to a second exemplary embodiment, as viewed from the arm lower side in a state in which the retainer cover has been removed from the wiper arm.

As illustrated in FIG. 12, FIG. 15, and FIG. 16, the retainer 230 is formed in a substantially elongated shape, and is formed with a substantially U-shaped cross-section profile (concave profile) that is open toward the arm lower side (the windshield glass G side) as viewed along the length direction. Specifically, the retainer 230 is configured including a top wall 230A, and a pair of side walls 230B, 230C extending from the two width direction ends of the top wall 230A toward the arm lower side. The width dimension of the retainer 230 (in other words, the facing separation between the pair of side walls 230B, 230C, and corresponding to the width dimension of the wiper arm 212) is set so as to become smaller on progression toward the leading end side of the retainer 230. Namely, the retainer 230 is configured so as to become narrower on progression toward the leading end side (FIG. 12 and FIG. 16).

Figure 20:
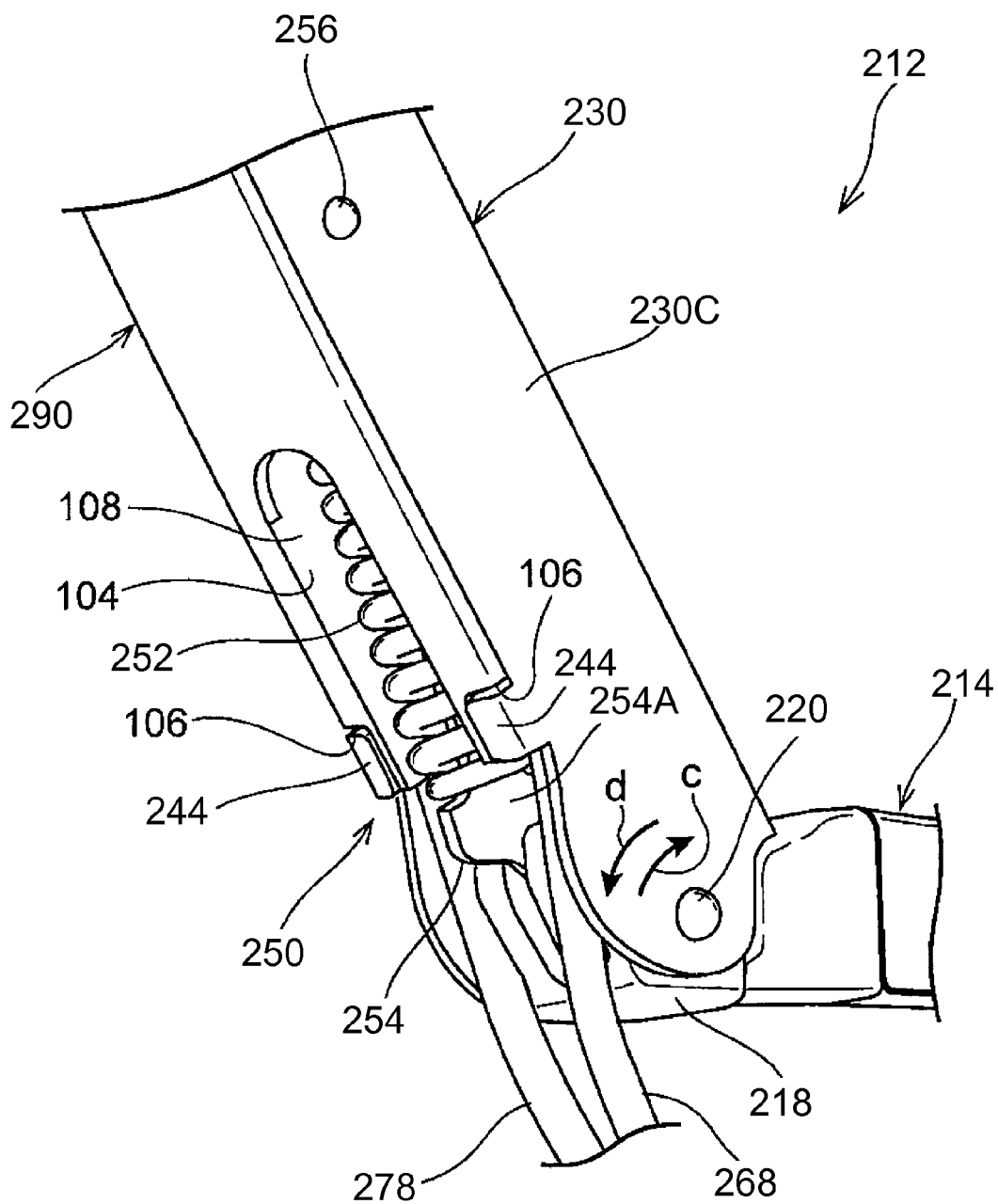
FIG. 20 is a perspective view illustrating the vicinity of a base end portion of a retainer when the retainer is disposed in a flipped-up position.

As illustrated in FIG. 12 and FIG. 20, the head side coupling portion 218 of the arm head 214 is housed inside a base end portion of the retainer 230, with the base end portion of the retainer 230 coupled to the arm head 214. Specifically, the two length direction end portions of the coupling shaft 220 are fixed to the base end portions of the pair of side walls 230B, 230C of the retainer 230 by crimping, or the like. The retainer 230 is thereby configured so as to be coupled to the arm head 214, and so as to be capable of swinging about an axis of the coupling shaft 220 (in the arrow c direction and the arrow d direction in FIG. 9). More specifically, the retainer 230 is configured so as to swing between a wiping position in which it is disposed facing the windshield glass G (the position illustrated in FIG. 18A), and a flipped-up position flipped up with respect to the windshield glass G, in which it has been swung from the wiping position, in a direction away from the windshield glass G (the position illustrated in FIG. 18B). When the retainer 230 has been swung to the flipped-up position, the base end of the top wall 230A of the retainer 230 abuts the leading end portion of the arm head 214, so as to restrain further swinging of the retainer 230 toward the opposite side to the windshield glass G.

Figure 17B:
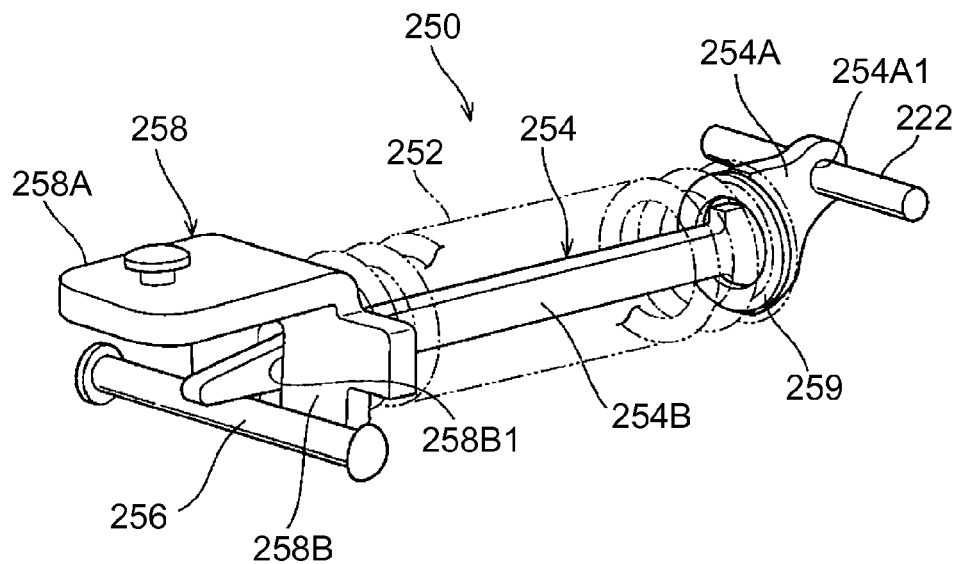
FIG. 17B is a perspective view illustrating the urging mechanism illustrated in FIG. 17A, as viewed from the arm leading end side.

Moreover, as illustrated in FIG. 17A and FIG. 17B, an urging mechanism 250 is provided between the retainer 230 and the arm head 214, such that, in the wiping position of the retainer 230, the retainer 230 is urged toward the windshield glass G side by the urging mechanism 250. Explanation follows regarding the urging mechanism 250.

The urging mechanism 250 is configured including an urging spring 252 that is assembled in compressed state so as to impart urging force to the retainer 230, a spring guide 254 for maintaining the orientation of the urging spring 252, and a pin 256 and stopper 258 for anchoring the leading end side of the spring guide 254.

The spring guide 254 is manufactured from a steel sheet or the like and is formed in a substantially elongated shape along the length direction of the retainer 230. The spring guide 254 is coupled to the head side coupling portion 218 of the arm head 214, is disposed inside the base end portion of the retainer 230, and has its sheet thickness direction along the width direction of the retainer 230. Specifically, a substantially trapezoidal sheet shaped seat portion 254A is formed to a base end portion of the spring guide 254, and a portion on the base end side of the seat portion 254A is inserted inside the slit 218A of the head side coupling portion 218 of the arm head 214. A coupling hole 254A1 (see FIG. 17B) is formed piercing through the seat portion 254A, and the spring guide 254 is supported by the support shaft 222 so as to be capable of swinging with the support shaft 222 inserted into the coupling hole 254A1.

The spring guide 254 is equipped with a substantially rectangular bar shaped guide portion 254B, and the guide portion 254B extends from a substantially up-down direction intermediate portion of the seat portion 254A toward the leading end direction of the retainer 230. In the wiping position of the retainer 230, the guide portion 254B is disposed at the arm lower side (the windshield glass G side) of the coupling hole 254A1 (the support shaft 222). In other words, the coupling hole 254A1 (the support shaft 222) is disposed offset to the arm upper side (the opposite side to the windshield glass G) with respect to the guide portion 254B.

Figure 18A:
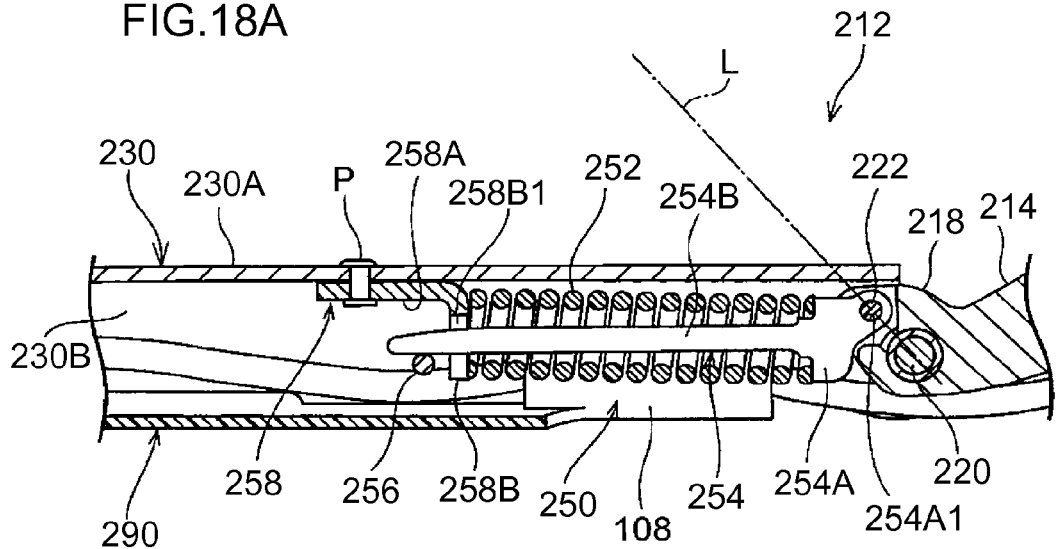
FIG. 18A is a side cross-section illustrating a state of an urging mechanism when a retainer is disposed in a wiping position.
Figure 18B:
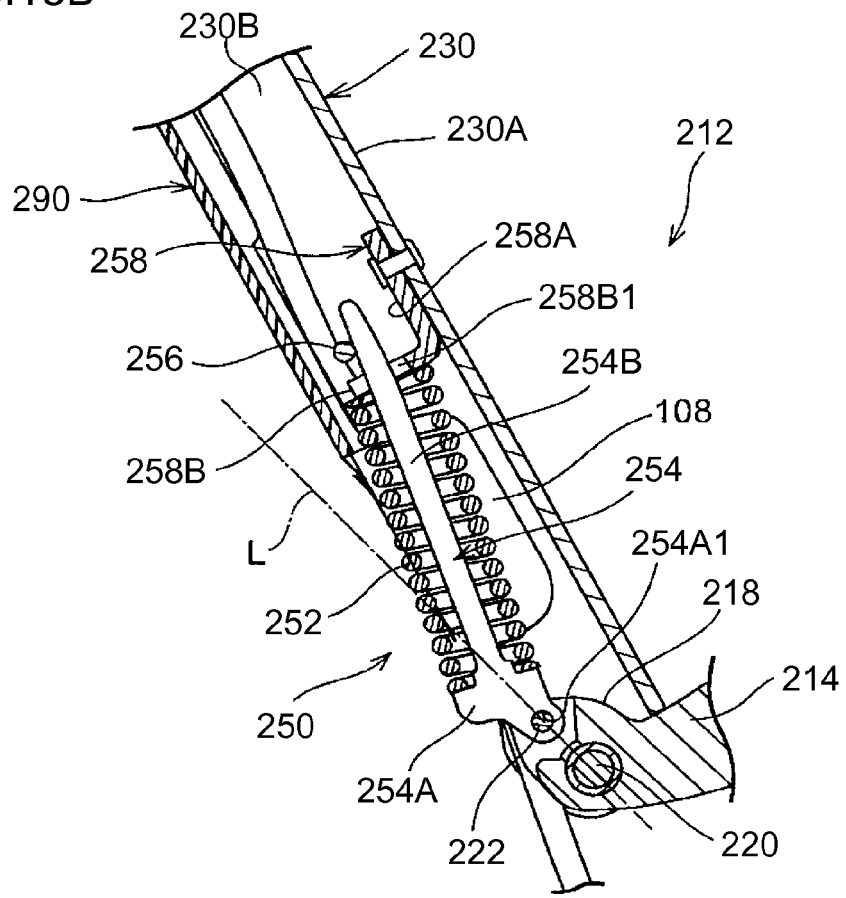
FIG. 18B is a side cross-section illustrating a state of an urging mechanism when a retainer is disposed in a flipped-up position.

As illustrated in FIG. 18A and FIG. 18B, the pin 256 is disposed with its axial direction along the width direction of the retainer 230, and is fixed so as to span across between the pair of side walls 230B, 230C of the retainer 230. The pin 256 is disposed at the arm lower side (the windshield glass G side) with respect to the leading end portion of the spring guide 254 (the guide portion 254B), and is anchored in a state abutting the leading end portion of the guide portion 254B.

The stopper 258 is disposed inside the retainer 230, and is formed with a substantially inverted L-shaped sheet shape in side view. Specifically, the stopper 258 is configured including a fixing wall 258A that is disposed parallel to the top wall 230A of the retainer 230, and a stopper wall portion 258B that extends from an end portion of the fixing wall 258A on the arm base end side toward the arm lower side. The fixing wall 258A is positioned at the arm upper side of the pin 256, and is fixed with a fixing pin P to the top wall 230A of the retainer 230 by crimping. In this state, the stopper wall portion 258B is disposed on the base end side of the retainer 230 with respect to the pin 256.

Moreover, a guide slit 258B1 that is open toward the arm lower side is formed at a width direction central portion of the stopper wall portion 258B, and the leading end portion of the spring guide 254 (the guide portion 254B) is inserted inside the guide slit 258B1. Namely, the leading end portion of the spring guide 254 (the guide portion 254B) is clamped from the arm upper and lower directions by the guide slit 258B1 of the stopper 258 and by the pin 256. The retainer 230 is thereby configured such that even when the retainer 230 swings about the axis of the coupling shaft 220 with respect to the arm head 214, the spring guide 254 is capable of swinging about the axis of the support shaft 222.

The urging spring 252 is attached to the spring guide 254, and is disposed between the stopper 258 and the seat portion 254A of the spring guide 254. Specifically, the guide portion 254B of the spring guide 254 is inserted inside the urging spring 252, and the urging spring 252 is attached to the spring guide 254 in a compression deformed state. In such a state, the leading end portion of the urging spring 252 urges the stopper wall portion 258B of the stopper 258 toward the leading end side of the retainer 230. A washer 259 (see FIG. 17B) is interposed between the base end portion of the urging spring 252 and the seat portion 254A of the spring guide 254, such that the base end portion of the urging spring 252 is supported by the washer 259.

As illustrated in FIG. 18A, in a wiping position of the retainer 230, the stopper wall portion 258B is positioned on the windshield glass G side with respect to an imaginary line L connecting the axial center of the coupling shaft 220 to the axial center of the support shaft 222 in side view. Thus in the wiping position of the retainer 230, urging force due to the urging spring 252, acts on the retainer 230 toward the windshield glass G side, so as to press a wiper blade 120 against the windshield glass G.

As illustrated in FIG. 18B, in the flipped-up position of the retainer 230, the stopper wall portion 258B is positioned on the opposite side of the imaginary line L to that of the windshield glass G. Thus, in the flipped-up position of the retainer 230, urging force due to the urging spring 252 acts on the retainer 230 toward the opposite side to the windshield glass G. Accordingly, urging force acts on the retainer 230 toward the opposite side to the windshield glass G, so as to retain the retainer 230 in the flipped-up position.

Moreover, when the retainer 230 is disposed in the flipped-up position, the support shaft 222 is disposed more toward the opening side of the retainer 230 than when the retainer 230 is disposed in the wiping position. When this occurs, a portion at the base end side of the urging spring 252 projects out (juts out) from the opening of the retainer 230.

Returning to explanation of the configuration of the retainer 230, as illustrated in FIG. 12, a lateral bend portion 232 is formed so as to bend in a crank shape at the leading end side of the retainer 230, and the leading end portion of the retainer 230 is offset toward one swing direction side of the base end portion of the retainer 230. A length direction intermediate portion of the wiper blade 120 is coupled to the leading end portion of the retainer 230. The wiper blade 120 is thereby disposed on the one swing direction side with respect to the retainer 230 (portions thereof excluding the leading end portion) as viewed along the arm up-down direction (see FIG. 13 and FIG. 14).

A first engagement tab 234 engaged by a first engagement hook 294 of a retainer cover member 290, described below, is integrally formed at a portion on the leading end side of the retainer 230 (more specifically, to a portion at the arm base end side with respect to the lateral bend portion 232) at the side wall 230B at one side in the width direction of the retainer 230. The first engagement tab 234 bends toward the width direction inside of the retainer 230 at a lower end of the side wall 230B. Namely, the width direction of the first engagement tab 234 matches the length direction of the retainer 230 (of the wiper arm 212).

Figure 19:
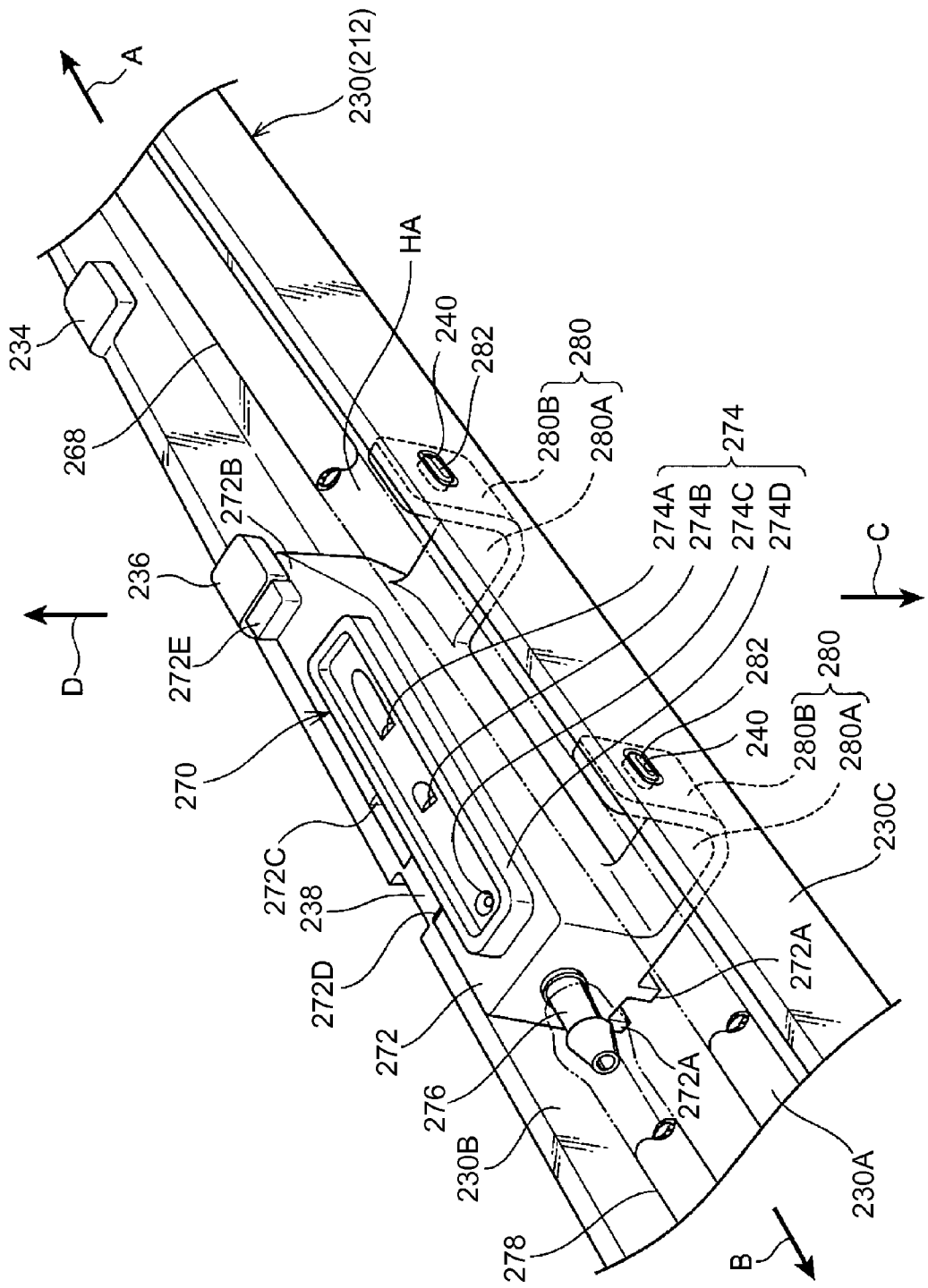
FIG. 19 is an expanded perspective view illustrating a length direction intermediate portion of the retainer illustrated in FIG. 12.

As illustrated in FIG. 19, a second engagement tab 236 that engages with a second engagement hook 298 of the retainer cover member 290, described below, is integrally formed at the side wall 230B of the retainer 230 at a position on the arm base end side of the first engagement tab 234. The second engagement tab 236 is configured similarly to the first engagement tab 234. Namely, the second engagement tab 236 bends toward the width direction inside of the retainer 230 at a lower end of the side wall 230B. Thus for the second engagement tab 236, the width direction of the second engagement tab 236 also matches the length direction of the retainer 230 (of the wiper arm 212).

The first engagement tab 234 and the second engagement tab 236 on the retainer 230 accordingly project out to the width direction inside of the retainer 230 with respect to the side wall 230B, and are disposed in a row along the length direction of the retainer 230 at the one side in the width direction of the opening of the retainer 230. Moreover, the projection amount of the first engagement tab 234 and the second engagement tab 236 is set such that the leading end of the first engagement tab 234 and the leading end of the second engagement tab 236 are disposed further to the one side than the center in the width direction of the retainer 230.

Moreover, an embossed portion 238 (an element falling within the broad definition of a "projection portion") for attaching an intermediate nozzle member 270, described below, is integrally formed at the lower edge portion of the side wall 230B of the retainer 230, at a position on the arm base end side with respect to the second engagement tab 236 (see FIG. 19). The embossed portion 238 is formed with a substantially rectangular block shape along the length direction of the retainer 230, and is pressed out (projects) toward the width direction inside of the retainer 230 with respect to the side wall 230B. The embossed portion 238 is punched toward inside in the retainer 230 width direction by half blanking or the like with a dimension smaller than the sheet thickness dimension of the side wall 230B.

Moreover, a pair of engagement holes 240 for attaching the intermediate nozzle member 270, described later, are formed piercing through the side wall 230C on the other side in the width direction of the retainer 230. The pair of engagement holes 240 is formed by elongated shape holes along the length direction of the retainer 230, and is respectively disposed at a lower end portion of the side wall 230C with a specific interval therebetween in the length direction of the retainer 230.

As illustrated in FIG. 12, a pair of third engagement tabs 242 that engages with third engagement hooks 102 of the retainer cover member 290, described below, are integrally formed at a length direction intermediate portion of the side walls 230B, 230C of the retainer 230. The third engagement tabs 242 respectively bend toward the width direction inside of the retainer 230 at the lower end of the side walls 230B, 230C, and are disposed in a row along the width direction of the retainer 230.

A pair of fourth engagement tabs 244 (elements falling within the broad definition of a "retainer side engagement portion") for engaging with a base end portion of the retainer cover member 290, described below, are integrally formed at the side walls 230B, 230C of the retainer 230 at a base end portion of the retainer 230. The fourth engagement tabs 244 are configured similarly to the third engagement tabs 242. Namely, the fourth engagement tabs 244 respectively bend toward the width direction inside of the retainer 230 at a lower end of the side walls 230B, 230C, and are disposed in a row along the width direction of the retainer 230.

Thus in the retainer 230, the third engagement tabs 242 and the fourth engagement tabs 244 project out toward the width direction inside of the retainer 230 with respect to the side walls 230B, 230C, and are disposed in the opening of the retainer 230. The projection amount of the third engagement tabs 242 and the fourth engagement tabs 244 is set such that the leading ends of the pair of third engagement tabs 242 and the leading ends of the pair of fourth engagement tabs 244 are respectively disposed separated from each other in the width direction of the retainer 230. Although the width dimension becomes narrower at the leading end side of the retainer 230 while the base end side of the retainer 230 becoming wider, it is still possible to set a sufficient projection amount even when the third engagement tabs 242 and the fourth engagement tabs 244 are formed so as to be separated and facing each other along the width direction of the retainer 230.

Leading End Side Nozzle Member 260

As illustrated in FIG. 12, the leading end side nozzle member 260 is provided at a leading end portion of the retainer 230. The leading end side nozzle member 260 is formed with a substantially rectangular block shape, and is attached on the retainer 230 in a state abutting an outside face of the side wall 230B of the retainer 230. Specifically, the leading end side nozzle member 260 includes a nozzle attachment portion 262, and the nozzle attachment portion 262 passes through inside a first hole (not illustrated in the drawings) formed in the side wall 230B of the retainer 230 so as to be disposed inside the retainer 230. A pair of hook portions is formed at the nozzle attachment portion 262, and the hook portions engage with edge portions of the first hole, so as to attach the leading end side nozzle member 260 to the retainer 230.

The leading end side nozzle member 260 also includes a leading end side nozzle connection portion 264. The leading end side nozzle connection portion 264 passes through inside a second hole (not illustrated in the drawings) formed in the side wall 230B of the retainer 230, so as to be disposed inside the retainer 230. Plural leading end side nozzle ejection holes 266A, 266B are provided so as to be indented into the lower face of the leading end side nozzle member 260, with the leading end side nozzle ejection holes 266A, 266B disposed in a row along the length direction of the wiper arm 212, and in communication with the leading end side nozzle connection portion 264.

One end portion of a leading end side nozzle hose 268 is laid out inside the arm head 214 and the retainer 230, and is connected to the leading end side nozzle connection portion 264, and the leading end side nozzle connection portion 264 is connected to a first washer pump (not illustrated in the drawings) of the vehicle through the leading end side nozzle hose 268. Configuration is thus made such that washer fluid pumped from a vehicle washer tank (not illustrated in the drawings) by the first washer pump is supplied to the leading end side nozzle member 260 through the leading end side nozzle hose 268. Configuration is made such that the washer fluid supplied to the leading end side nozzle member 260 is ejected onto the windshield glass G by the leading end side nozzle ejection holes 266A, 266B. Specifically, the washer fluid from the leading end side nozzle ejection holes 266A, 266B is ejected onto the wiper blade 120 travel direction side when the wiper blade 120 is swinging toward the forward motion side (the arrow a direction in FIG. 14) in the to-and-fro swing of the wiper blade 120.

Intermediate Nozzle Member 270

As illustrated in FIG. 19, the intermediate nozzle member 270 is disposed inside the retainer 230 so as to be adjacent to the second engagement tab 236 at an arm base end side thereof. Specifically, as illustrated in FIG. 14, the intermediate nozzle member 270 is attached to the retainer 230 so that the intermediate nozzle member 270 is disposed, with respect to a portion at the base end side of the wiper arm 212, more to the other rotation direction side than a length direction intermediate portion of the wiper blade 120. Moreover, as illustrated in FIG. 19, the intermediate nozzle member 270 is configured including a nozzle body 272 and a pair of nozzle engagement tabs 280.

The nozzle body 272 is formed in a substantially rectangular block shape, extending along the length direction of the retainer 230. The nozzle body 272 is disposed adjacent to the side wall 230B at one side in the width direction of the retainer 230. Specifically, the nozzle body 272 is disposed at a side of the center of the retainer 230 in the width direction. A pair of ribs 272A are integrally provided at the upper face of the nozzle body 272 (the face facing toward the top wall 230A in the arm up-down direction of the wiper arm 212). The ribs 272A project out from the nozzle body 272 toward the arm upper side, and extend along the length direction of the nozzle body 272. The leading end faces of the ribs 272A abut the top wall 230A of the retainer 230. The lower face of the nozzle body 272 (the face on the windshield glass G side) is disposed flush with the end face of the side wall 230B of the retainer 230.

An end portion at the length direction side of the nozzle body 272 (the arm leading end side) configures a first engaged portion 272B, and the first engaged portion 272B is disposed adjacently on the arm upper side of an end portion at the arm bases end side of the second engagement tab 236 of the retainer 230. In other words, the first engaged portion 272B is inserted from the arm base end side between the top wall 230A and the second engagement tab 236 of the retainer 230. The first engaged portion 272B engages in the arm up-down direction with the second engagement tab 236, so as to restrain relative movement of the nozzle body 272 with respect to the retainer 230 toward the arm lower side (the windshield glass G side).

A groove 272C is formed in the side face at the one side in the width direction of the nozzle body 272. The groove 272C is formed in an indented shape open toward the one side in the width direction of the nozzle body 272 as viewed from the arm up-down direction, and piercing through in the arm up-down direction. The width dimension of the groove 272C (the dimension along the length direction of the nozzle body 272) is set larger than the width dimension of the embossed portion 238 of the retainer 230 (the dimension along the length direction of the wiper arm 212).

A housing indentation 272D is formed in the lower face of the nozzle body 272 at a position on the arm base end side of the groove 272C. The housing indentation 272D is open toward the one side in the width direction of the nozzle body 272 and toward the arm leading end side of the nozzle body 272, and is in communication with the groove 272C. The embossed portion 238 of the retainer 230 is disposed inside the housing indentation 272D, such that movement of the nozzle body 272 toward the arm lower side (the windshield glass G side) with respect to the retainer 230 is restrained by the embossed portion 238.

A stopper 272E is integrally formed at the lower face of the nozzle body 272 at a portion of the leading end on the arm leading end side. The stopper 272E is formed in a substantially rectangular block shape, and projects out from the nozzle body 272 toward the arm lower side. The stopper 272E is disposed adjacent to the arm base end side of the second engagement tab 236 of the retainer 230, so as to abut an end face in the width direction of the second engagement tab 236.

Moreover, the nozzle body 272 includes a nozzle section 274 that ejects washer fluid onto the windshield glass G. The nozzle section 274 is disposed on the arm base end side of the nozzle body 272 with respect to the first engaged portion 272B and the stopper 272E as viewed from the arm lower side, and is disposed inside of the groove 272C in the nozzle body 272 width direction. The nozzle section 274 is configured including plural intermediate nozzle ejection holes 274A, 274B, 274C (at 3 locations in the present exemplary embodiment), and a surrounding wall 274D that surrounds the intermediate nozzle member ejection holes 274A to 274C.

The plural intermediate nozzle ejection holes 274A to 274C are provided as indentations in the lower face of the nozzle body 272, and are disposed in a row along the length direction of the nozzle body 272. The surrounding wall 274D is formed in a substantially rectangular frame shape, projects out from the lower face of the nozzle body 272 toward the arm lower side, and surrounds the intermediate nozzle ejection holes 274A to 274C.

Moreover, an intermediate nozzle connection portion 276 is integrally formed to the end portion at the arm base end side of the nozzle body 272. The intermediate nozzle connection portion 276 is formed in a substantially circular column shape with its axial direction along the length direction of the nozzle body 272, projecting out from the nozzle body 272 toward the arm base end side. The inside of the intermediate nozzle member 270 is in communication with the inside of the intermediate nozzle ejection holes 274A to 274C within the nozzle body 272.

One end portion of an intermediate nozzle hose 278, that is laid out inside the arm head 214 and the retainer 230, is connected to the intermediate nozzle connection portion 276, and the intermediate nozzle connection portion 276 is connected through the intermediate nozzle hose 278 to a second washer pump (not illustrated in the drawings) of the vehicle. The washer fluid pumped from a vehicle washer tank (not illustrated in the drawings) by the second washer pump is accordingly supplied to the intermediate nozzle member 270.

Configuration is made such that the washer fluid supplied to the intermediate nozzle member 270 is ejected by the intermediate nozzle ejection holes 274A to 274C toward the windshield glass G. Specifically, the washer fluid is ejected from the intermediate nozzle ejection holes 274A to 274C onto the wiper blade 120 travel direction side when the wiper blade 120 is swinging toward the return motion side (the arrow b direction in FIG. 14) in the to-and-fro swing of the wiper blade 120.

When attaching the intermediate nozzle member 270 to the retainer 230, first, the intermediate nozzle member 270 is attached to the inside of the retainer 230 from the arm lower side such that the embossed portion 238 of the retainer 230 is inserted into the groove 272C of the intermediate nozzle member 270. When this is performed, the first engaged portion 272B of the intermediate nozzle member 270 is set so as to be positioned on the arm base end side of the second engagement tab 236, so as not to interfere with the second engagement tab 236 of the retainer 230. Then, in a state in which the embossed portion 238 is inserted into the groove 272C, the embossed portion 238 is housed inside the housing indentation 272D by sliding the intermediate nozzle member 270 toward the arm leading end side of the retainer 230, and the first engaged portion 272B is inserted at the arm upper side of the second engagement tab 236, such that the intermediate nozzle member 270 is attached to the retainer 230.

The pair of nozzle engagement tabs 280 extend from an upper end portion of the nozzle body 272 toward the other side in the width direction of the retainer 230, and are each bent in a substantially L-shape as viewed from the length direction of the nozzle body 272. Specifically, each nozzle engagement tab 280 is configured including a first arm 280A that extends from an upper end portion of the nozzle body 272 toward the other side in the width direction of the retainer 230, and a second arm 280B that extends from the leading end of the first arm 280A toward the arm lower side (the open side of the retainer 230).

The pair of nozzle engagement tabs 280 are disposed in a row along the length direction of the nozzle body 272, and are disposed at positions corresponding to the engagement holes 240 of the retainer 230. A substantially circular arc shape is formed at a boundary portion (bend portion) between the first arm 280A and the second arm 280B when viewed along the length direction of the nozzle body 272, and the first arm 280A and the second arm 280B are connected together smoothly. Moreover, each nozzle engagement tab 280 (mainly the second arm 280B) is configured so as to be capable of elastic deformation in the width direction of the wiper arm 212 (capable of being elastically pressed toward the other side in the width direction of the retainer 230).

A hook 282 that projects out toward the other side in the width direction of the wiper arm 212 is integrally formed to a leading end portion of the nozzle engagement tabs 280 (to the second arm 280B). The hook 282 is formed in a substantially rectangular block shape along the length direction of the wiper arm 212, and the hook 282 fits inside (engages with) the engagement holes 240 in the assembled position. Relative movement of the nozzle engagement tabs 280 of the intermediate nozzle member 270 is accordingly retrained with respect to the retainer 230 in the up-down direction and in the length direction of the wiper arm 212.

Moreover, as stated above, the width dimension of the retainer 230 is set so as to be larger on progression toward the base end side. Configuration is made such that, in a state in which the intermediate nozzle member 270 is disposed in a temporary assembly position, the intermediate nozzle member 270 is disposed inside the pair of side walls 230B, 230C of the retainer 230 in a state in which the nozzle engagement tabs 280 are not elastically deformed. For example, configuration may be made such that the hooks 282 do not abut the inside face of the side wall 230C of the retainer 230. Namely, temporary assembly location of intermediate nozzle member 270, the width dimension of the retainer 230, the projection amount of the hook 282, and the like are appropriately set such that, in the temporary assembly position, the hooks 282 do not abut the inside face of the side wall 230C of the retainer 230.

Retainer Cover Member 290

Figure 21:
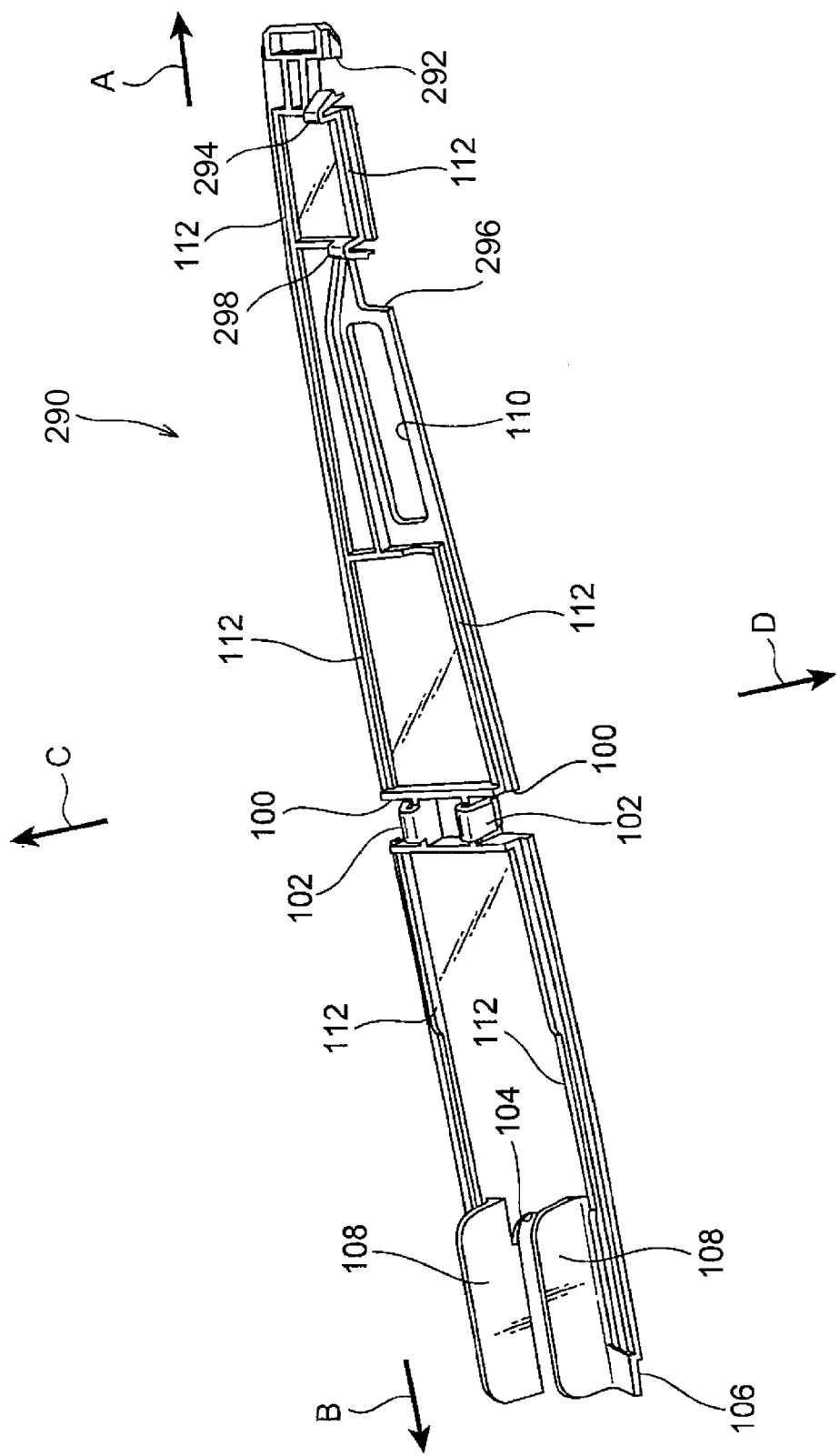
FIG. 21 is perspective view illustrating the inside of the retainer cover illustrated in FIG. 12.

As illustrated in FIG. 12 and FIG. 21, the retainer cover member 290 is configured from a resin material. The retainer cover member 290 is formed in a substantially elongated sheet shape along the length direction of the retainer 230, is disposed with its sheet thickness direction along the arm up-down direction, and is attached to the retainer 230 so as to close off the opening of the retainer 230 from the arm lower side. The width dimension of the retainer cover member 290 is also set to correspond to the width dimension of the retainer 230, so as to become smaller on progression toward the leading end side, and is configured such that the retainer cover member 290 does not project out toward the width direction outside of the retainer 230 (see FIG. 16) in the attached state of the retainer cover member 290.

A first cutout 292 is formed at a leading end portion of the retainer cover member 290 at a position corresponding to the first engagement tab 234 of the retainer 230, and the first cutout 292 is formed in a substantially indented shape open toward one side in the width direction of the retainer cover member 290. Namely, the width direction of the first cutout 292 matches the length direction of the retainer cover member 29. The width dimension of the first cutout 292 is set so as to be larger than the width dimension of the first engagement tab 234 of the retainer 230, and such that the first engagement tab 234 is disposed inside the first cutout 292 in an attached state of the retainer cover member 290 (see FIG. 16 and FIG. 22B).

Figure 22A:
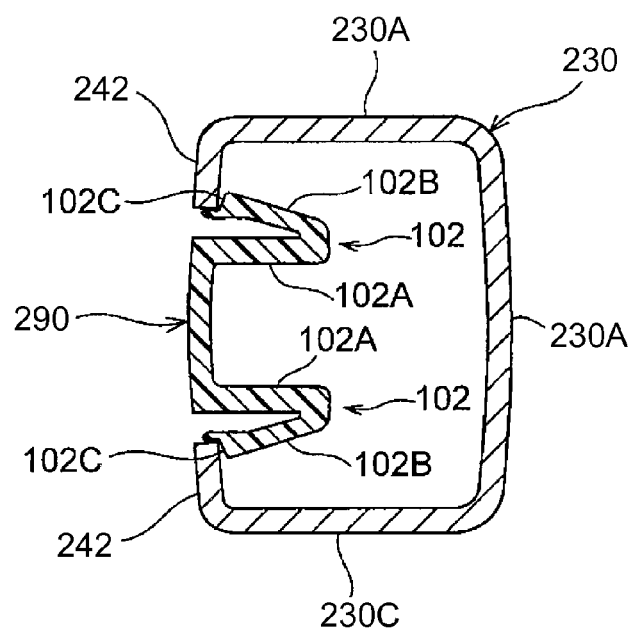
FIG. 22A is cross-section of third engagement hooks of a retainer cover, as viewed from the arm leading end side (a cross-section taken on line 11A-11A in FIG. 12)
Figure 22B:
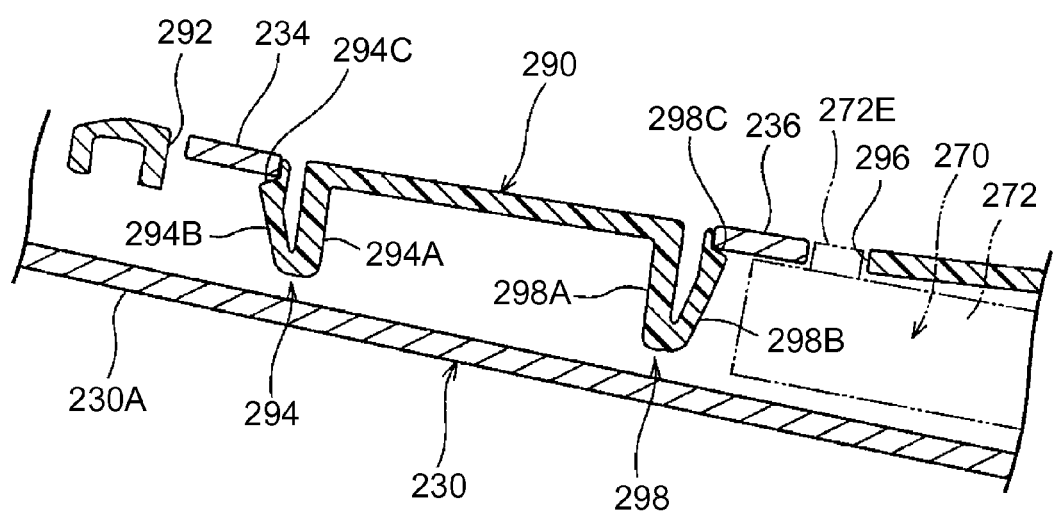
FIG. 22B is a cross-section of a first engagement hook and a second engagement hook of a retainer cover, as viewed from one width direction side of the retainer cover (a cross-section taken on line 11B-11B in FIG. 12)

The first engagement hook 294 is also integrally formed to an edge portion at the arm base end side of the first cutout 292. The first engagement hook 294 is formed in a sheet shape with its sheet thickness direction substantially along the length direction of the retainer cover member 290, and is bent into a substantially V-shape that opens toward the arm lower side in side view. Specifically, as illustrated in FIG. 22B, the first engagement hook 294 is configured including a first body portion 294A that extends from an edge portion on the arm base end side of the first cutout 292 toward the arm upper side, and a first arm portion 294B that extends from the leading end (upper end) of the first body portion 294A toward the arm leading end side and toward the arm lower side. The first arm portion 294B is accordingly disposed inside the first cutout 292 as viewed along the arm up-down direction. Moreover, the sheet thickness of the first arm portion 294B is set thinner than the sheet thickness of the first body portion 294A, and the first arm portion 294B is configured so as to be capable of elastic deformation toward the arm base end side (a direction approaching the first body portion 294A). In an attached state of the retainer cover member 290, the first body portion 294A is positioned at the arm base end side of the retainer 230 with respect to the first engagement tab 234.

Moreover, an engaging indentation 294C is formed at a leading end portion of the first arm portion 294B of the first engagement hook 294, and the engaging indentation 294C is formed in a substantially inverse-L-shape in side view, open toward the arm leading end side and the arm lower side. In an attached state of the retainer cover member 290, an end portion on the arm base end side of the first engagement tab 234 of the retainer 230 engages with the engaging indentation 294C in a state in which the first arm portion 294B is elastically deformed toward the arm base end side. Configuration is accordingly made such that movement of the leading end portion of the retainer cover member 290 toward the arm lower side (the windshield glass G side) is restrained by the first engagement hook 294.

As illustrated in FIG. 12 and FIG. 21, a second cutout 296 is formed at the leading end portion of the retainer cover member 290 at a position on the arm base end side of the first cutout 292. The second cutout 296 is formed in a substantially indented shape open toward the one side in the width direction of the retainer cover member 290. Namely, in the second cutout 296 too, the width direction of the second cutout 296 matches the length direction of the retainer cover member 290. Moreover, the width dimension of the second cutout 296 is set so as to be larger than the sum of the width dimension of the second engagement tab 236 of the retainer 230 and the width dimension of the stopper 272E of the intermediate nozzle member 270. The second engagement tab 236 and the stopper 272E are configured so as to be disposed inside the second cutout 296 in the attached state of the retainer cover member 290 (see FIG. 16 and FIG. 22B).

Moreover, the second engagement hook 298 that projects out toward the arm upper side is integrally formed to the edge portion on the arm leading end side of the second cutout 296. The second engagement hook 298 is configured so as to form a pair with the first engagement hook 294, and is formed in a substantially symmetrical shape to the first engagement hook 294 along the length direction of the retainer 230. Namely, the second engagement hook 298 is formed in a sheet shape with its sheet thickness direction substantially along the length direction of the retainer cover member 290, and is bent into a substantially V-shape open toward the arm lower side in side view. As illustrated in FIG. 22B, the second engagement hook 298 is configured including a second body portion 298A that extends from an edge portion on the arm leading end side of the second cutout 296 toward the arm upper side, and a second arm portion 298B that extends from the leading end (upper end) of the second body portion 298A toward the arm lower side and the arm base end side. The second arm portion 298B is accordingly disposed inside the second cutout 296 as viewed along the arm up-down direction. Moreover, the sheet thickness of the second arm portion 298B is set thinner than the sheet thickness of the second body portion 298A, and the second arm portion 298B is configured so as to be capable of elastically deforming toward the arm leading end side (a direction to approach the second body portion 298A). The extension length of the second body portion 298A is set so as to be slightly longer than the extension length of the first body portion 294A of the first engagement hook 294. The extension length of the second arm portion 298B is set so as to be slightly longer than the extension length of the first arm portion 294B of the first engagement hook 294. In the attached state of the retainer cover member 290, the second body portion 298A is positioned at the arm leading end side of the retainer 230 with respect to the second engagement tab 236.

Moreover, an engaging indentation 298C is formed in a leading end portion of the second arm portion 298B of the second engagement hook 298, and the engaging indentation 298C is formed in a substantially L-shape in side view, open toward the arm base end side and the arm lower side. In an attached state of the retainer cover member 290, an end portion on the arm leading end side of the second engagement tab 236 of the retainer 230 engages with the engaging indentation 298C in a state in which the second arm portion 298B is elastically deformed toward the arm leading end side. Configuration is accordingly made such that movement of the leading end portion of the retainer cover member 290 toward the arm lower side (the windshield glass G side) is restrained by the second engagement hook 298.

In the attached state of the retainer cover member 290, the first engagement hook 294, the second engagement hook 298, and the intermediate nozzle member 270 (the nozzle body 272) are disposed adjacent to the side wall 230B of the retainer 230, and are disposed in a row along the length direction of the retainer 230. Namely, the first engagement hook 294, the second engagement hook 298, and the intermediate nozzle member 270 (the nozzle body 272) are disposed inside the retainer 230 so as to be disposed as a group at the one side in the width direction of the retainer 230. Inside the retainer 230, an area on the other side in the width direction of the retainer 230 to that of the first engagement hook 294, the second engagement hook 298, and the intermediate nozzle member 270 is a hose layout area HA (see FIG. 12 and FIG. 19), and the leading end side nozzle hose 268 is laid out in the hose layout area HA.

As illustrated in FIG. 12 and FIG. 21, a pair of third cutouts 100 is formed at a length direction intermediate portion of the retainer cover member 290 at a position corresponding to the pair of third engagement tabs 242 on the retainer 230. Each of the third cutouts 100 is formed in a substantially indented shape open toward the width direction outside of the retainer cover member 290. Namely, in the third cutouts 100 too, the width direction of each of the third cutouts 100 matches the length direction of the retainer cover member 290. The width dimension of each of the third cutouts 100 is set larger than the width dimension of each of the third engagement tabs 242 of the retainer 230, and configuration is made such that the third engagement tabs 242 are disposed inside the third cutouts 100 in the attached state of the retainer cover member 290.

Moreover, a third engagement hook 102 projecting out toward the arm upper side is integrally formed to an edge portion at the bottom side of each of the third cutouts 100. The third engagement hooks 102 are formed with left-right symmetry in the width direction of the retainer 230. Specifically, the third engagement hooks 102 are formed in a sheet shape with their sheet thickness direction substantially along the width direction of the retainer cover member 290, and are bent into substantially V-shapes that are open toward the arm lower side when viewed along the length direction of the retainer cover member 290. As illustrated in FIG. 22A, the third engagement tabs 242 are each configured including a third body portion 102A that extends from an edge portion at the bottom side of the third cutout 100 toward the arm upper side, and a third arm portion 102B that extends from the leading end (upper end) of the third body portion 102A toward the arm lower side and toward the width direction outside of the retainer cover member 290. Thus, the third arm portions 102B are disposed inside the third cutouts 100, when viewed along the arm up-down direction. Moreover, the sheet thickness of the third arm portions 102B is set so as to be thinner than the sheet thickness of the third body portions 102A, and the third arm portions 102B are configured so as to be capable of elastically deforming toward the width direction inside of the retainer cover member 290 (a direction to approach the third body portion 102A). Thus in the attached state of the retainer cover member 290, the pair of third body portions 102A are disposed at inside in the retainer 230 width direction with respect to the third engagement tabs 242 of the retainer 230.

An engaging indentation 102C is formed at a leading end portion of the third arm portion 102B of each of the third engagement hooks 102. The engaging indentations 102C are formed in substantially L-shapes open toward outside in the width direction of the retainer cover member 290 and the arm lower side as viewed along the length direction of the retainer cover member 290. In the attached state of the retainer cover member 290, the leading end portions of the third engagement tabs 242 of the retainer 230 engage with the engaging indentations 102C in a state in which the third arm portions 102B are elastically deformed toward inside in the width direction of the retainer cover member 290. Configuration is accordingly made such that movement of a length direction intermediate portion of the retainer cover member 290 toward the arm lower side is restrained by the third engagement hooks 102.

Moreover, as illustrated in FIG. 12 and FIG. 21, a spring cutout 104 is formed as a "cutout" at a width direction central portion of a base end portion of the retainer cover member 290. The spring cutout 104 is formed in a substantially U-shape open toward the base end side of the retainer cover member 290 as viewed along the arm up-down direction. In the flipped-up position of the retainer 230, a portion of the urging spring 252 projecting out from the opening of the retainer 230 is prevented from interfering with the retainer cover member 290 by the spring cutout 104 (see FIG. 20). Namely, the width dimension of the spring cutout 104 is set slightly larger than the external diameter of the urging spring 252, and the cutout depth of the spring cutout 104 is set to a depth such that the urging spring 252 does not interfere with the retainer cover member 290 in the flipped-up position. A portion of the urging spring 252 is thereby exposed from the arm lower side (the windshield glass G side) by the spring cutout 104. Thus "a cutout that exposes the urging spring toward the windshield glass side" in the vehicle wiper of the present disclosure includes cases in which a portion of the urging spring is exposed toward the windshield glass side.

Moreover, a base end side engagement portion 106 is formed at each base end portion of the retainer cover member 290 at respective positions on the width direction outside (on both sides) of the spring cutout 104. The base end side engagement portions 106 are connected to the retainer cover member 290 via step portions, and are disposed at a position one step back to the arm upper side of the retainer cover member 290 (at the inside of the retainer 230). In the attached state of the retainer cover member 290, the base end side engagement portions 106 are inserted at the arm upper side of the fourth engagement tabs 244 of the retainer 230. Movement toward the arm lower side (the windshield glass G side) of the base end portion of the retainer cover member 290 is thereby restrained.

Moreover, a pair of partitioning walls 108 are integrally formed to a base end portion of the retainer cover member 290. The partitioning walls 108 are disposed with their sheet thickness directions along the width direction of the retainer cover member 290, and extend (project out) from an edge portion of the opening of the spring cutout 104 toward the arm upper side (the inside of the retainer 230). The partitioning walls 108 are disposed adjacent to, and outside in the retainer 230 width direction of the urging spring 252. The inside of the retainer 230 is accordingly partitioned by the partitioning walls 108 into a space in which the urging spring 252 is disposed, and spaces at outside in the retainer 230 width direction of the urging spring 252. The leading end side nozzle hose 268 and the intermediate nozzle hose 278 are respectively laid out in the spaces to the outsides in the width direction of the retainer 230 with respect to the urging spring 252, this being spaces partitioned by the partitioning walls 108.

Moreover, an exposing hole 110 for exposing the nozzle section 274 of the intermediate nozzle member 270 is formed piercing through a portion at the one side in the width direction of the retainer cover member 290 between the second cutout 296 and the third cutouts 100. The exposing hole 110 is formed in a substantially rectangular shape along the length direction of the retainer cover member 290 so as to correspond to the surrounding wall 274D of the intermediate nozzle member 270. The size of the exposing hole 110 is set slightly larger than the external profile of the surrounding wall 274D of the intermediate nozzle member 270. The surrounding wall 274D is placed (fitted) inside the exposing hole 110, and the nozzle section 274 is exposed to the arm lower side of the retainer cover member 290 (see FIG. 16).

Moreover, as illustrated in FIG. 21, plural ribs 112 are formed at outside portions in the width direction of the upper face of the retainer cover member 290 (the face on the opposite side to that of the windshield glass G). The ribs 112 project out from the retainer cover member 290 toward the arm upper side. In the attached state of the retainer cover member 290, the outer peripheral edge portion on the upper face of the retainer cover member 290 abuts the leading end faces of the side walls 230B, 230C of the retainer 230, and the ribs 112 are disposed adjacent to the inside faces of the side walls 230B, 230C. Moreover, in the attached state of the retainer cover member 290, the lower face (the face facing the windshield glass G) of the retainer cover member 290, and the respective lower faces (the faces facing the windshield glass G) of the first engagement tab 234, the second engagement tab 236, the third engagement tabs 242, and the fourth engagement tabs 244 are disposed flush with each other. Namely, the step height of the base end side engagement portion 106 is set so as to be substantially the same as the sheet thickness of the fourth engagement tabs 244 (the retainer 230).

Next, explanation follows regarding the operation and advantageous effects of the present exemplary embodiment, while explaining a procedure to attach the retainer cover member 290 to the retainer 230.

To attach the retainer cover member 290 to the retainer 230, the base end side engagement portions 106 of the retainer cover member 290 are engaged in the arm up-down direction with the fourth engagement tabs 244 by inserting the base end side engagement portions 106 at an angle from the arm leading end side and the arm upper side of the fourth engagement tabs 244 of the retainer 230. When this is performed, the urging spring 252 is disposed between the pair of partitioning walls 108, with one of the partitioning walls 108 disposed between the urging spring 252 and the leading end side nozzle hose 268, and the other of the partitioning walls 108 disposed between the urging spring 252 and the intermediate nozzle hose 278. The urging spring 252, the leading end side nozzle hose 268, and the intermediate nozzle hose 278 are thereby respectively disposed in spaces inside the retainer 230 partitioned by the partitioning walls 108. Moreover, when this occurs, the ribs 112 of the retainer cover member 290 are disposed so as to engage with the inside faces of the side walls 230B, 230C of the retainer 230. The retainer cover member 290 is attached to the retainer 230 in this state by pressing a length direction intermediate portion and leading end portion of the retainer cover member 290 toward the arm upper side (the retainer 230 side).

Specifically, the retainer cover member 290 is disposed in the opening of the retainer 230 such that the third engagement tabs 242 of the retainer 230 are disposed inside the pair of third cutouts 100 of the retainer cover member 290, the second engagement tab 236 of the retainer 230 is disposed inside the second cutout 296, and the first engagement tab 234 of the retainer 230 is disposed inside the first cutout 292.

When the length direction intermediate portion of the retainer cover member 290 is pressed toward the arm upper side, the leading ends of the third engagement tabs 242 contact the third arm portions 102B of the third engagement hooks 102 of the retainer cover member 290, and the third arm portions 102B elastically deform toward the width direction inside of the retainer cover member 290. When the length direction intermediate portion of the retainer cover member 290 is further pressed in toward the arm upper side, the third engagement tabs 242 and the third engagement hooks 102 engage, by leading end portions of the third engagement tabs 242 fitting into the engaging indentations 102C of the third engagement hooks 102, and with the third arm portions 102B in an elastically deformed state toward the width direction inside of the retainer cover member 290.

The length direction intermediate portion of the retainer cover member 290 is thereby attached to the retainer 230.

When the leading end portion of the retainer cover member 290 is pressed in toward the arm upper side, the end portion on the arm leading end side of the second engagement tab 236 contacts the second arm portion 298B of the second engagement hook 298 of the retainer cover member 290, and the second arm portion 298B is elastically deformed toward the leading end side of the retainer cover member 290. The end portion on the arm base end side of the first engagement tab 234 contacts the first arm portion 294B of the first engagement hook 294 of the retainer cover member 290, and the first arm portion 294B elastically deforms toward the base end side of the retainer cover member 290. Namely, the first arm portion 294B of the first engagement hook 294 and the second arm portion 298B of the second engagement hook 298 are elastically displaced in directions along the length direction of the retainer 230 (the retainer cover member 290).

When the leading end portion of the retainer cover member 290 is pressed in further toward the arm upper side, the second engagement tab 236 and the second engagement hook 298 engage, by the end portion at the arm leading end side of the second engagement tab 236 fitting into the engaging indentation 298C of the second engagement hook 298, with the second arm portion 298B in an elastically deformed state toward the leading end side of the retainer cover member 290. Moreover, the first engagement tab 234 and the first engagement hook 294 engage by the end portion at the arm base end side of the first engagement tab 234 fitting into the engaging indentation 294C of the first engagement hook 294, with the first arm portion 294B in an elastically deformed state toward the base end side of the retainer cover member 290. The leading end portion of the retainer cover member 290 is thereby attached to the retainer 230. In this state, the nozzle section 274 of the intermediate nozzle member 270 is exposed to the arm lower side by the surrounding wall 274D fitting into the exposing hole 110 of the retainer cover member 290. In this state, the peripheral edge portion at the upper face of the retainer cover member 290 contacts the end faces of the side walls 230B, 230C of the retainer 230, and the ribs 112 of the retainer cover member 290 are disposed inside the side walls 230B, 230C.

According to the vehicle wiper 210 of the present exemplary embodiment, as described above, the spring cutout 104 is formed at the base end portion of the retainer cover member 290, and the urging spring 252 is exposed to the windshield glass G side by the spring cutout 104. Thus when the retainer 230 is swung with respect to the arm head 214 and disposed in the flipped-up position, the urging spring 252 can be prevented from interfering with the retainer cover member 290 even when the portion at the base end side of the urging spring 252 juts out from the opening of the retainer 230. This thereby enables the attached state of the retainer cover member 290 to be well maintained even in cases in which urging force is imparted to the retainer 230 by the urging spring 252.

The base end side engagement portions 106 are also formed at the base end portion of the retainer cover member 290 at both sides in the width direction of the retainer cover member 290 with respect to the spring cutout 104. In the attached state of the retainer cover member 290, the base end side engagement portions 106 are inserted at the arm upper side of the fourth engagement tabs 244 of the retainer 230, and engage in the arm up-down direction with the fourth engagement tabs 244. Movement toward the arm lower side (the windshield glass G side) of the retainer cover member 290 can thereby be restrained at both width direction sides of the spring cutout 104. This thereby enables the attached state of the retainer cover member 290 to be maintained even better.

Moreover, in the initial stage of attaching the retainer cover member 290 to the retainer 230, the base end portion of the retainer cover member 290 is attached to the retainer 230 by inserting the base end side engagement portions 106 at the arm upper side of the fourth engagement tabs 244 of the retainer 230. This thereby enables the positioning of the retainer cover member 290 to be determined with respect to the retainer 230 at the initial stage when the retainer cover member 290 is being attached to the retainer 230. This thereby raises the ease of attachment of the retainer cover member 290.

Moreover, the pair of partitioning walls 108 are integrally formed to the base end portion of the retainer cover member 290, and the partitioning walls 108 are disposed with their sheet thickness direction along the width direction of the retainer cover member 290, and projecting out toward the inside of the retainer 230 from the edge portions of the opening of the spring cutout 104. The inside of the retainer 230 is thereby partitioned by the partitioning walls 108 into the space in which the urging spring 252 is disposed, and spaces at outsides in the retainer 230 width direction of the urging spring 252. The leading end side nozzle hose 268 and the intermediate nozzle hose 278 are each respectively laid out in the spaces partitioned by the partitioning walls 108 at the retainer 230 width direction outsides of the urging spring 252. This thereby enables the leading end side nozzle hose 268 and the intermediate nozzle hose 278 to be laid out in the retainer 230, while preventing the leading end side nozzle hose 268 and the intermediate nozzle hose 278 from interfering with the urging spring 252. Moreover, although the orientation of the urging spring 252 disposed inside the retainer 230 changes in according to swinging of the retainer 230 with respect to the arm head 214, the leading end side nozzle hose 268 and the intermediate nozzle hose 278 can be prevented from becoming trapped between the urging spring 252 and the retainer cover member 290, due to the leading end side nozzle hose 268 and the intermediate nozzle hose 278 being respectively partitioned from the space in which the urging spring 252 is disposed.

Moreover, due to the partitioning walls 108 projecting out from the edge portions of the opening of the spring cutout 104 toward the inside of the retainer 230, the various things inside the retainer 230, such as the leading end side nozzle hose 268 and the intermediate nozzle hose 278, are covered (capped) by the partitioning walls 108, enabling the inside of the retainer 230 to be prevented from being visible through the opening of the spring cutout 104. This thereby enables the inside of the retainer 230 to be covered (capped) by the retainer cover member 290, while the urging spring 252 is disposed between the partitioning walls 108, and hence enables foreign matter, such as dried leaves, to be prevented from penetrating inside the retainer through the opening of the spring cutout 104.

The ribs 112 are formed to the edge portions at the outer periphery of the retainer cover member 290, projecting from the retainer cover member 290 toward the inside of the retainer 230, and the ribs 112 are disposed adjacent to the inside faces of the side walls 230B, 230C of the retainer 230. Thus in the attached state of the retainer cover member 290, movement in the width direction of the base end side of the retainer cover member 290 with respect to the retainer 230 can be restrained by the ribs 112 and the partitioning walls 108. More specifically, movement in the width direction of the base end portion of the retainer cover member 290 that is divided in the width direction by the spring cutout 104 can be restrained by the ribs 112 and the partitioning walls 108. This thereby enables an even better attachment state to be achieved to the base end portion of the retainer cover member 290.

Moreover, the base end side engagement portion 106 of the retainer cover member 290, is connected to the retainer cover member 290 via a step portion, and the base end side engagement portions 106 are disposed at a position one step back to the arm upper side (the inside of the retainer 230) with respect to the retainer cover member 290. The step height of the base end side engagement portions 106 is set to be substantially the same as the sheet thickness of the fourth engagement tabs 244 (the retainer 230), and in an attached state of the retainer cover member 290, the lower face of the retainer cover member 290 and the respective lower faces of the fourth engagement tabs 244 are disposed flush with each other. This thereby enables the appearance of the vehicle wiper 210 to be improved.

In the present exemplary embodiment, the first engagement hook 294 and the second engagement hook 298 are formed at a leading end portion of the retainer cover member 290, however the second engagement hook 298 may be omitted. In such cases, although this results in an embodiment in which only the first engagement hook 294 is formed at the leading end portion of the retainer cover member 290, the first engagement hook 294 is configured so as to be capable of elastically deforming toward the base end side of the retainer cover member 290, and, due to the base end side engagement portions 106 being formed at the base end portion of the retainer cover member 290, the position of the retainer 230 in the length direction of the retainer cover member 290 can be restrained by the first engagement hook 294 and the base end side engagement portions 106.

In the present exemplary embodiment, the second engagement tab 236 of the retainer 230 is employed both as a portion engaged by the second engagement hook 298 of the retainer cover member 290, and as a portion engaged by the intermediate nozzle member 270. However, instead, a portion for engaging with the second engagement hook 298 of the retainer cover member 290, and a portion for engaging with the intermediate nozzle member 270, may be separately set.

Figure 23:
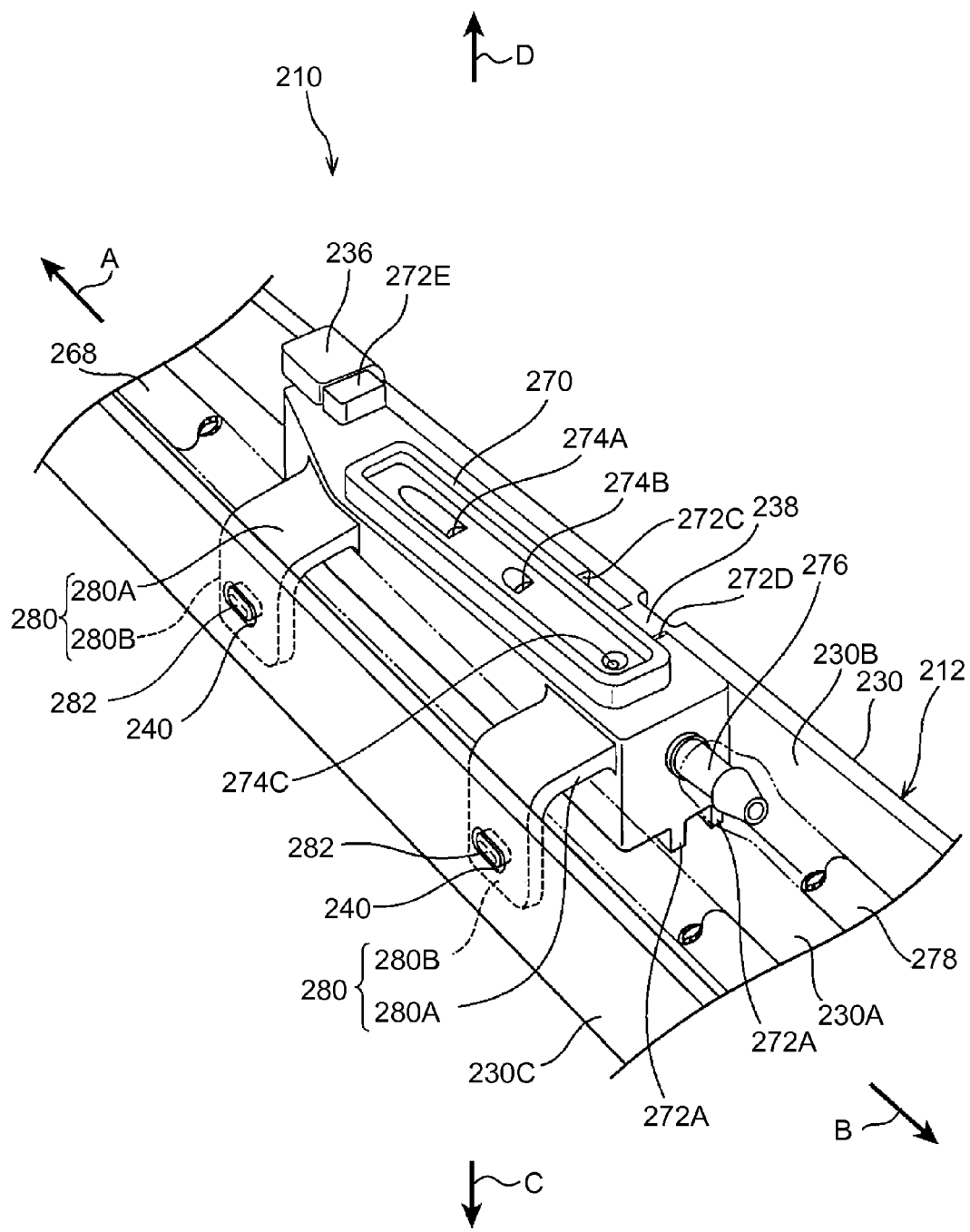
FIG. 23 is a perspective view illustrating a modified example of an engagement hook of the first nozzle illustrated in FIG. 19, as viewed from the arm lower side.

Moreover, in the present exemplary embodiment, the nozzle engagement tabs 280 of the intermediate nozzle member 270 are each configured including the first arm 280A that extends from the upper end portion of the nozzle body 272 toward the width direction outside of the retainer 230, and the second arm 280B that extends from the leading end of the first arm 280A toward the opening side of the retainer 230. However instead, as illustrated in FIG. 23, the nozzle engagement tabs 280 may be configured by a first arm 280A that extends from a lower end portion of the nozzle body 272 toward the width direction outside of the wiper arm 212, and a second arm 280B that extends from the leading end of the first arm 280A toward the top wall 230A side of the retainer 230. In such cases, the leading end side nozzle hose 268 can be disposed inside the space between the first arms 280A of the nozzle engagement tabs 280 and a top wall 230A of the retainer 230. The leading end side nozzle hose 268 can thereby be restrained from coming out of the opening side of the retainer 230 by the first arm 280A. As a result, productivity when attaching the retainer cover member 290 to the retainer 230 can be improved.

Explanation follows regarding a third exemplary embodiment of a vehicle wiper, with reference to FIG. 24 to FIG. 29.

Figure 24:
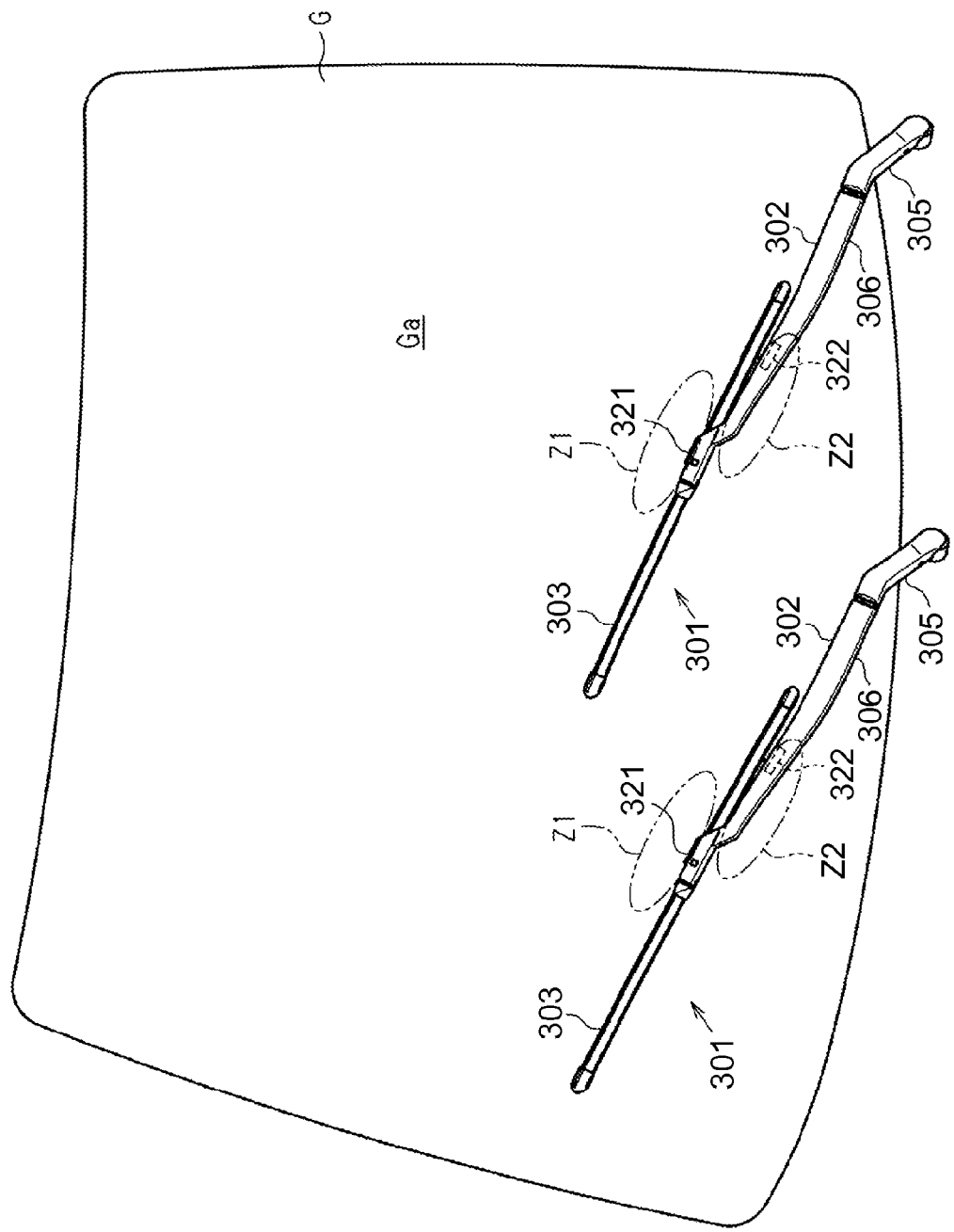
FIG. 24 is a schematic view to explain a vehicle wiper of a third exemplary embodiment, and the operation thereof.

As illustrated in FIG. 24, vehicle wipers 301 wipe a wiping surface Ga that is a vehicle cabin outside surface of a windshield glass G of a vehicle, and are respectively provided on the driver seat side (the right side in FIG. 24) and the passenger seat side (the left side in FIG. 24).

Figure 25:
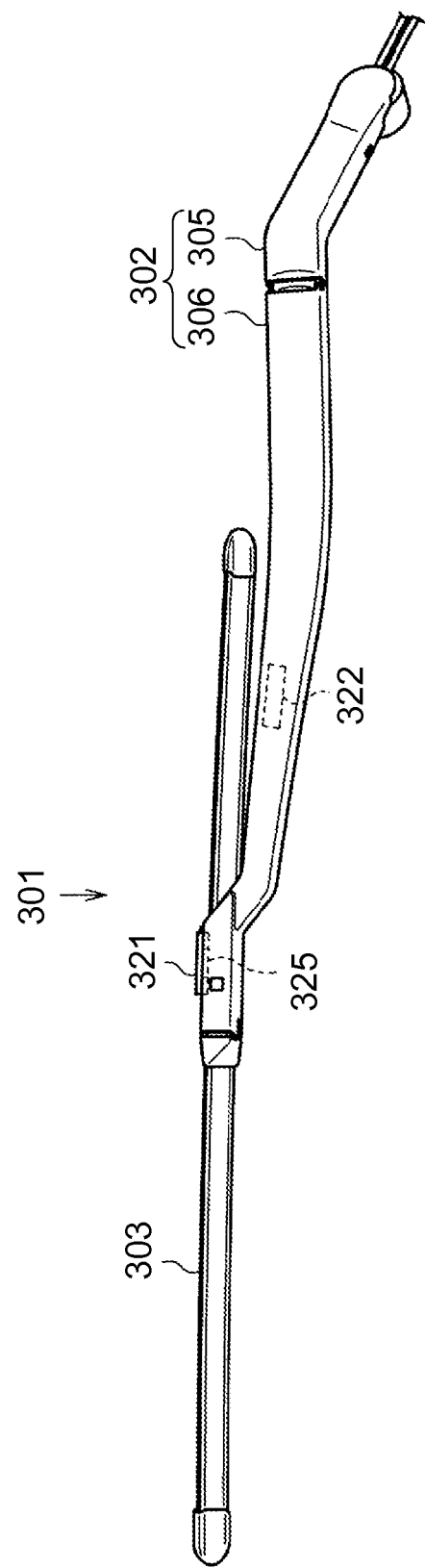
FIG. 25 is a plan view of a vehicle wiper according to the third exemplary embodiment.

As illustrated in FIG. 24 and FIG. 25, the vehicle wipers 301 are each equipped with a wiper arm 302, and a wiper blade 303 that is coupled to the wiper arm 302.

The wiper arm 302 is fixed to a pivot shaft 304 (see FIG. 27 and FIG. 28) that is swung to-and-fro by driving force of a non-illustrated motor that is a forward/reverse rotation controlled motor. The wiper arm 302 is equipped with an elongated shaped arm head 305 that swings integrally with the pivot shaft, and a retainer 306 serving as an elongated shaped movable section that is coupled to the length direction leading end portion of the arm head 305 so as to be capable of swinging about an axial center L lying along a direction different to that of the pivot shaft 304. The wiper blade 303 for wiping the wiping surface Ga is coupled to the length direction leading end portion of the retainer 306.

Figure 26:
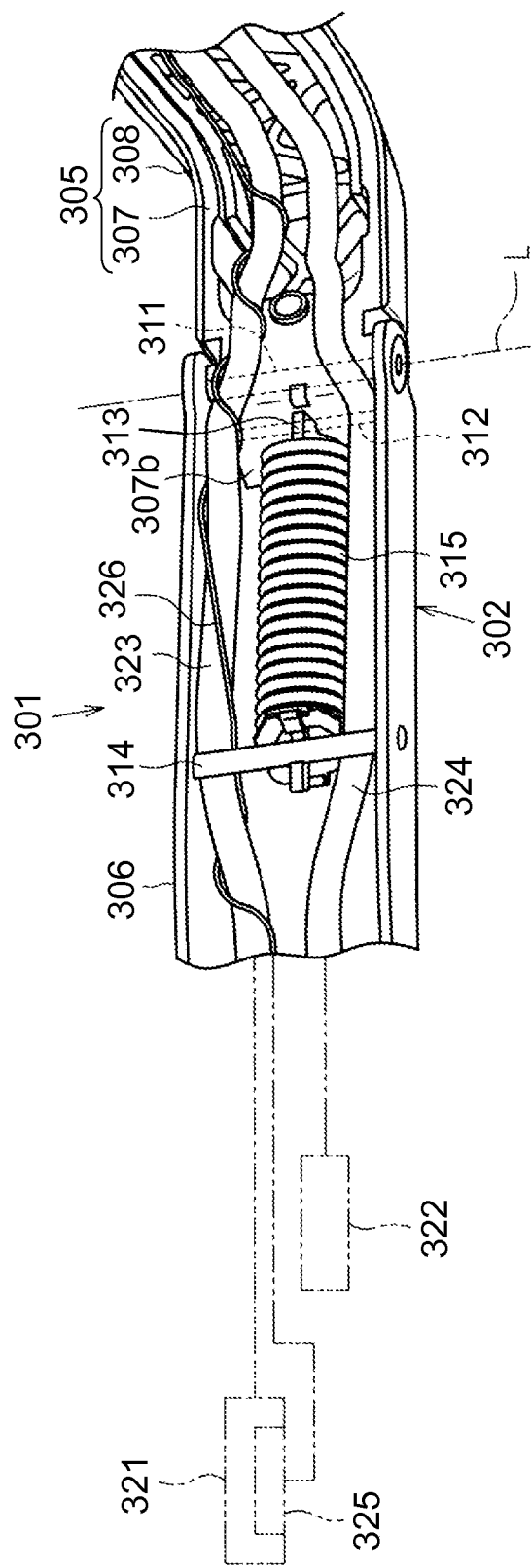
FIG. 26 is a partial perspective view to explain a configuration of a vehicle wiper of the third exemplary embodiment.
Figure 27:
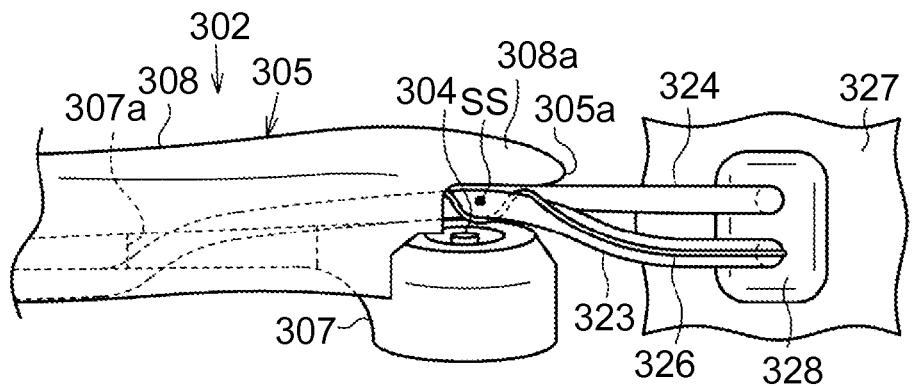
FIG. 27 is a partial perspective view to explain a base end portion of a vehicle wiper of the third exemplary embodiment.
Figure 28:
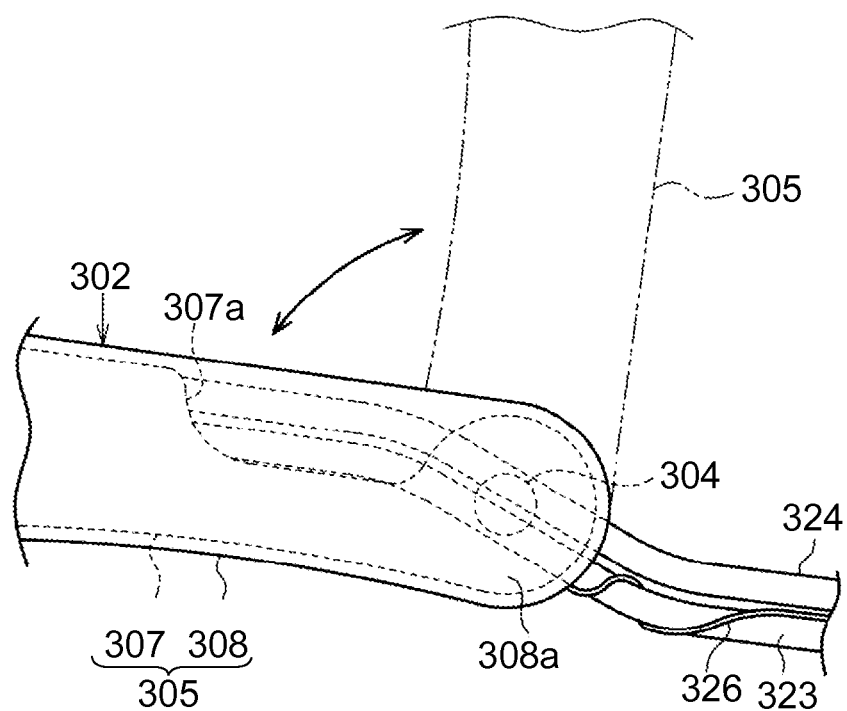
FIG. 28 is a partial plan view to explain a base end portion of a vehicle wiper of the third exemplary embodiment.
Figure 29:
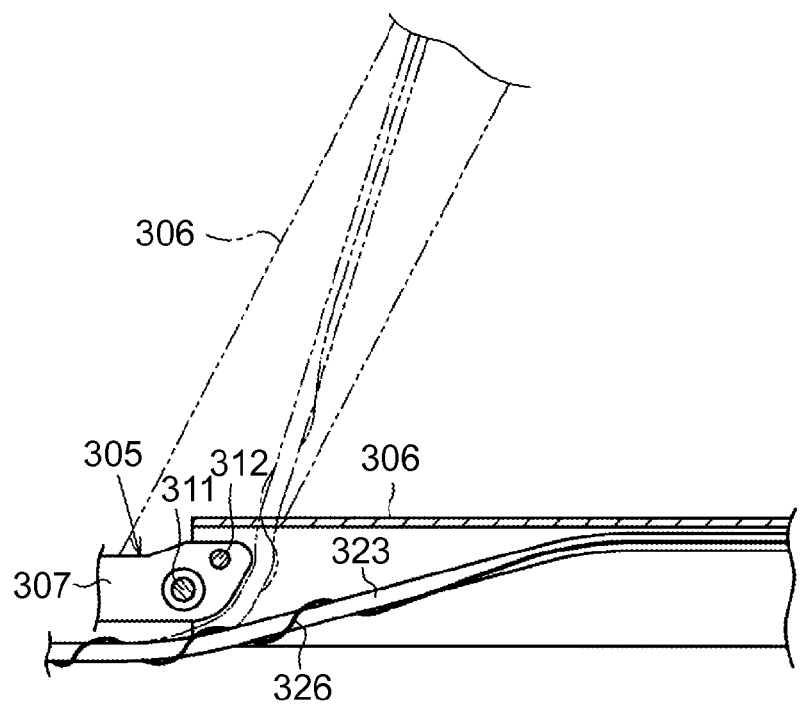
FIG. 29 is schematic view to explain operation of a vehicle wiper of the third exemplary embodiment.

As illustrated in FIG. 26 to FIG. 28, the arm head 305 in the present exemplary embodiment includes an arm head body 307 that is made from metal, and an arm head cover 308 that is made from resin and assembled to the arm head body 307 from the upper side (from the opposite side to the wiping surface). The arm head body 307 is formed in a substantially angular U-shape in cross-section profile taken orthogonal to the length direction, and is formed in an elongated shape open toward the lower side (the back face side) facing the wiping surface Ga. Moreover, as illustrated in FIG. 27 and FIG. 28, a cutout 307a is formed by cutting out one side in the width direction of an intermediate portion of the arm head body 307. The cutout 307a is formed in a groove shape in a side face of the intermediate portion of the arm head body 307, is open toward the one side in the width direction, and communicates the lower side and the upper side of the arm head body 307 with each other. In the arm head 305, the base end portion of the arm head body 307 is fixed to the pivot shaft 304, and swings integrally with the pivot shaft 304. The arm head cover 308 is formed in a shape that substantially covers the upper face and the side faces of the arm head body 307, with an axial cover 308a formed at a base end side of the arm head cover 308, covering over the pivot shaft 304 such that there is a gap SS (see FIG. 27) formed above the pivot shaft 304. At the base end portion of the arm head 305, the gap SS forms an opening 305a (by the arm head body 307 and the arm head cover 308) that is open toward the length direction base end side.

As illustrated in FIG. 26, a coupling protrusion 307b is formed at the length direction leading end portion of the arm head body 307 so as to be inserted between the two side walls at the length direction base end portion of the retainer 306. A shaft 311 passes through the coupling protrusion 307b and is supported by the two side walls of the retainer 306, coupling the arm head 305 and the retainer 306 together so as to be capable of swinging relative to each other.

A pin 312 that is parallel to the shaft 311 is embedded in a leading end portion of the coupling protrusion 307b of the arm head body 307, except for a length direction intermediate portion of the pin 312, and the base end portion of a support bar 313 is coupled to the length direction intermediate portion of the pin 312 so as to be capable of rotating. The leading end portion of the support bar 313 is supported by a pin 314, which is supported by the two side walls of the retainer 306 further to the leading end side than the pin 312. An urging spring 315 is fitted in a compressed state over the outside of the support bar 313, and retained so as to urge the leading end side of the retainer 306 (namely the wiper blade 303) toward the wiping surface Ga side with respect to the arm head 305.

As illustrated in FIG. 24 and FIG. 25, the vehicle wipers 301 are each equipped with a leading end side nozzle member 321, serving as a second nozzle member capable of ejecting supplied washer fluid onto the wiping surface Ga, at a leading end portion of the retainer 306. The vehicle wipers 301 are each equipped with an intermediate nozzle member 322, serving as a first nozzle member capable of ejecting supplied washer fluid onto the wiping surface Ga, at an intermediate portion of the retainer 306.

As illustrated in FIG. 26, the vehicle wipers 301 are each equipped with a hose 323 that is laid out along the wiper arm 302 (along the arm head 305 and the retainer 306) and supplies washer fluid to the leading end side nozzle member 321, and a hose 324 that is laid out along the wiper arm 302 (along the arm head 305 and the retainer 306) and supplies washer fluid to the intermediate nozzle member 322. The hoses 323, 324 are well known flexible hoses made from an elastic material, such as rubber, and, in particular, have an intrinsic self-restoring force enabling them to return from states of stretching and contracting, deforming, and bowing, to their original shape.

A defrosting heater 325 (for example a PTC thermistor or the like) is integrally incorporated (closely attached, or installed) to the leading end side nozzle member 321 in the present exemplary embodiment. As illustrated in FIG. 26, a heater conductor wire 326 is electrically connected to the heater 325, and the heater conductor wire 326 is laid out along the hoses 323. The heater conductor wire 326 of the present exemplary embodiment is a conductor wire that includes a plus power source conductor and a ground conductor, and is a conductor wire covered by a covering member so as to keep the plus power supply conductor and the ground conductor parallel to each other and insulated from each other.

As illustrated in FIG. 27, the hoses 323, 324 and the heater conductor wire 326 are led out through the cutout 307a of the arm head body 307, over the arm head body 307 (the gap SS), pass on through the gap SS, and are led out to the outside from the opening 305a provided at the base end portion of the arm head 305. The hoses 323, 324 and the heater conductor wire 326 led out to the outside through the opening 305a, are led into a cowl louvre 327 via a grommet 328 attached to the cowl louvre 327, and the hoses 323, 324 are connected to a non-illustrated washer pump, and the heater conductor wire 326 is connected to a non-illustrated power supply device.

The heater conductor wire 326 is wound around the hose 323 at the coupling portion of the retainer 306 to the arm head 305, namely, at the position corresponding to the shaft 311. More specifically, the heater conductor wire 326 of the present exemplary embodiment is wrapped, in a spiral shape, plural times (about three or four times) around the outside surface of the hose 323 so as to span the vicinity of the position corresponding to the shaft 311.

The heater conductor wire 326 of the present exemplary embodiment is also wrapped, about one or two turns, around the hose 323 at several locations other than the position corresponding to the shaft 311. Specifically, in the present exemplary embodiment, the heater conductor wire 326 is wrapped, about one or two turns, around the hose 323 between the pin 314 and the intermediate nozzle member 322 (see FIG. 26), and in the vicinity of the base end portion of the arm head 305 (see FIG. 27 and FIG. 28).

The hoses 323, 324 and the heater conductor wire 326 are led outside from the opening 305A provided at the base end portion of the arm head 305, and the upper portion of the base end portion of the arm head 305 is covered by the rear end edge of the non-illustrated engine hood, thereby preventing a detrimental effect on the appearance, and preventing irradiation with direct sunlight and the like.

Explanation follows regarding operation of the vehicle wipers 301 configured as described above.

When a washer switch provided at the driver seat is operated, the pivot shaft 304 is swung to-and-fro by driving force of the motor, and the vehicle wiper 301 is swung to-and-fro (oscillated). Washer fluid is supplied to the leading end side nozzle member 321 from the washer pump through the hose 323 during the forward motion of the vehicle wiper 301, and washer fluid is ejected onto the forward motion direction area Z1 from the leading end side nozzle member 321. Washer fluid is supplied to the intermediate nozzle member 322 from the washer pump through the hose 324 during the return motion of the vehicle wiper 301, and washer fluid is ejected onto the return motion direction area Z2 from the intermediate nozzle member 322. Thus the wiping surface Ga onto which the washer fluid has been ejected during the forward motion and during the return motion, is quickly wiped by the wiper blade 303 of the vehicle wiper 301, giving excellent cleaning of the wiping surface Ga.

The following is a list of characteristic advantageous effects of the above exemplary embodiment.

(1) The heater conductor wire 326 is wrapped around the flexible hose 323 at the position corresponding to the coupling portion of the retainer 306 to the arm head 305 (namely at neighboring area to the shaft 311). More specifically, the heater conductor wire 326 is wrapped plural times in a spiral shape around the outside surface of the hose 323 so as to span the vicinity of the position corresponding to the shaft 311. Thereby, for example, the heater conductor wire 326 is unified with the hose 323, in a state that does not include slack portions that hang away from the hose 323 even in the wiping position in which the retainer 306 is along the wiping surface Ga (see the solid lines in FIG. 29). Moreover, a configuration is achieved such that there is no large tension force acting on the heater conductor wire 326 when the retainer 306 is in the flipped-up position, flipped away from the wiping surface Ga (see the double-dotted intermittent lines in FIG. 29). Namely, the heater conductor wire 326 can be moved to a degree so as to be along the hose 323 since the heater conductor wire 326 is wrapped plural times in a spiral shape around the outer peripheral surface of the hose 323. Moreover, due to the flexibility of the hose 323, the hose 323 can shrink in diameter when the hose is pulled, a lager gap is accordingly to arise between the hose 323 and the heater conductor wire 326 wound around the hose 323, and tension force is not liable to act on the heater conductor wire 326 by the hose 323.

(2) In the leading end side nozzle member 321, due to providing the defrosting heater 325, frozen washer fluid or the like in the vicinity of the ejection ports of the leading end side nozzle member 321 can be thawed. Namely, although washer fluid or the like in the vicinity of the ejection ports of the leading end side nozzle member 321 is liable to freeze in a cold environment due to the leading end side nozzle member 321 being externally exposed, if frozen, then any freezing of the washer fluid or the like can be quickly thawed by heat generated by the heater 325.

(3) At the base end portion of the arm head 305 in the wiper arm 302, the axial cover 308a is provided covering over the pivot shaft 304 so as to form the gap SS above the pivot shaft 304, the opening 305a is provided with the gap SS open toward the base end direction, and the hoses 323, 324 and the heater conductor wire 326 are led outside through the opening 305A via the gap SS. A configuration can thereby be achieved in which the hoses 323, 324 and the heater conductor wire 326 are not readily imparted with tension force by swinging of the wiper arm 302 (see the arrows in FIG. 28). This thereby eliminates the need to provide a slack portion in advance to the hoses 323, 324 and the heater conductor wire 326. This thereby enables the hoses 323, 324 and the heater conductor wire 326 to be made shorter, and eliminates the need to secure space for the slackened hoses 323, 324, and the heater conductor wire 326.

(4) The heater conductor wire 326 is also wound about one or two turns at several locations around the hose 323 other than the position corresponding to the shaft 311, thereby enabling a unified state of the heater conductor wire 326 along the hose 323 to be maintained without employing adhesive tape or the like, even at positions other than the position corresponding to the shaft 311. This thereby enables the heater conductor wire 326 and the hose 323 to be treated as a unified unit during laying out in the wiper arm 302.

The following modifications may be made to the above exemplary embodiment.

Figure 30:
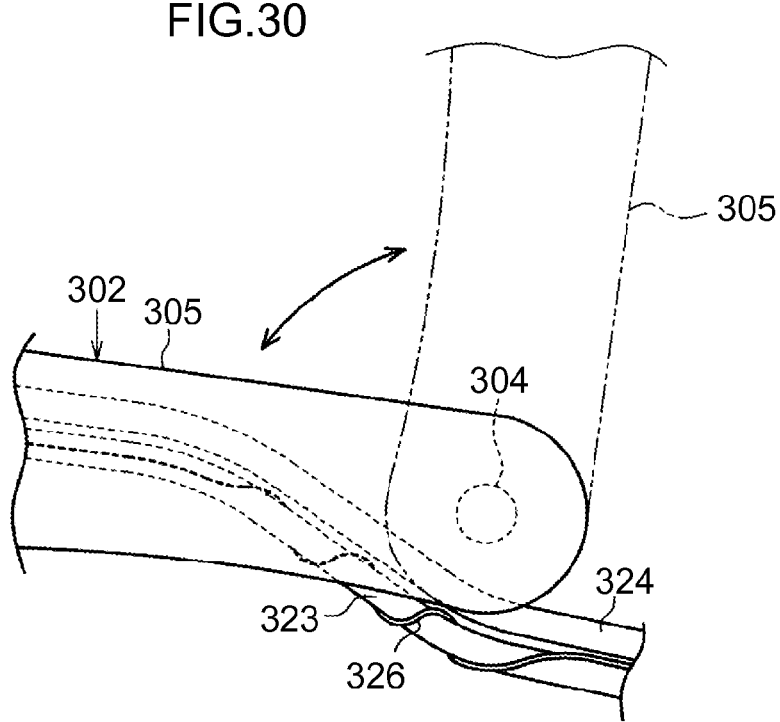
FIG. 30 is a partial plan view to explain a configuration of a vehicle wiper of a modified example of the third exemplary embodiment.

In the above exemplary embodiment, a configuration was adopted in which the hoses 323, 324 and the heater conductor wire 326 are led outside of the opening 305a through the gap SS in the base end portion of the wiper arm 302, however, there is no limitation thereto. For example, as illustrated in FIG. 30, configuration may be made such that the hoses 323, 324 and the heater conductor wire 326 are led outside from the side at the base end portion of the wiper arm 302 (the arm head 305), without passing over the pivot shaft 304. In such cases, the heater conductor wire 326 is preferably wrapped (plural times) around the hose 323 at the position corresponding to the coupling portion of the wiper arm 302 to the pivot shaft 304. Namely, in such cases, in the event that the heater conductor wire 326 is not wrapped around, there would be a concern that tension force would act on the hose 323 and the heater conductor wire 326 at the position corresponding to the coupling portion when the wiper arm 302 swings, and line-breaks would happen in the heater conductor wire 326 that does not readily stretch. This can be addressed by wrapping the heater conductor wire 326 around the hose 323, thereby achieving a configuration in which a large tension force does not to act on the heater conductor wire 326. More specifically, a configuration can be achieved in which a large tension force does not act on the heater conductor wire 326 in a state in which the wiper arm 302 is in the wiping-complete end position (see the double-dotted intermittent lines in FIG. 30), while also achieving a state in which the heater conductor wire 326 does not have slack so as to separate from the hose 323, even in the state in which the wiper arm 302 is in the home position.

In the above exemplary embodiment, the vehicle wipers 301 are each configured equipped with the heater 325 and the heater conductor wire 326, however, there is no limitation thereto, and, for example, configuration may be made as a vehicle wiper 1 in which the heater 325 is omitted, and a conductor wire for another purpose is provided, laid out by wrapping the conductor wire around a hose.

In the above exemplary embodiment, the heater conductor wire 326 is also wrapped about one or two turns around the hose 323 at several locations other than the position corresponding to the shaft 311, however, there is no limitation thereto, and the heater conductor wire 326 may be maintained in a state along the hose 323 by employing adhesive tape or the like at positions other than at positions corresponding to the shaft 311.

In the above exemplary embodiment, the heater conductor wire 326 is wound about three of four turns around the hose 323 at the position corresponding to the shaft 311, however, the number of wrap times may be changed to a different number. For example, about one or two turns may be employed as long as the risk of line-breaks in the heater conductor wire 326 can be avoided.

In the above exemplary embodiment, the heater 325 was only provided at the leading end side nozzle member 321, however, there is no limitation thereto, and a heater may also be provided at the intermediate nozzle member 322. Obviously, in such cases, a heater conductor wire connected to the heater provided at the intermediate nozzle member 322 is preferably wrapped around the hose 323 at the position corresponding to the shaft 311. A nozzle member other than the leading end side nozzle member 321 and the intermediate nozzle member 322 may also be provided, and configuration may also be made with only one nozzle member provided to the vehicle wipers 301. There may also be a nozzle member provided at the wiper blade 303.

What is claimed is:

1. A vehicle wiper comprising:
a retainer that is formed in an elongated shape open at a lower side facing toward a windshield, and that is provided so as to be capable of swinging about a shaft axis of a pivot shaft that is swung to-and-fro;
a first nozzle member that is housed inside the retainer, and that is capable of ejecting washer fluid from an ejection portion;
a retainer cover member that closes off an opening of the retainer;
an arm head whose base end portion is fixed to the pivot shaft, and whose leading end portion is coupled to the retainer so as to be capable of swinging;
an urging mechanism that is housed inside a length direction base end side of the retainer, and that urges the leading end side of the retainer toward the windshield side;
a first hose, that is housed inside the retainer, that is disposed parallel to the urging mechanism and along the length direction of the retainer, and that supplies washer fluid to the first nozzle member;
a second nozzle member that is provided at a length direction leading end portion of the retainer, or that is provided at a wiper blade coupled to the length direction leading end portion of the retainer, and that is capable of ejecting washer fluid from an ejection portion onto the opposite side of the wiper blade from that of the first nozzle member; and
a second hose that is housed inside the retainer and that supplies washer fluid to the second nozzle member,
wherein a partitioning wall is provided at the retainer cover member and extends along a length direction of the urging mechanism and a length direction of the first hose so as to be interposed between the urging mechanism and the first hose,
the first and second hoses are provided side-by-side along the length direction of the retainer and the first hose is disposed on one side of the urging mechanism and the second hose is disposed on the other side of the urging mechanism, and
the partitioning wall is respectively formed on both sides of the urging mechanism so as to be interposed between the urging mechanism and the two hoses.

2. The vehicle wiper of claim 1, wherein a hose restricting section that restricts flapping of the second hose is formed at the first nozzle member.

3. The vehicle wiper of claim 2, wherein:
a resilient fixing tab is formed at the first nozzle member for positional fixing of the first nozzle member itself to the retainer; and
the hose restricting section includes the resilient fixing tab.

4. The vehicle wiper of claim 3, wherein at least a portion of the retainer cover member is fixed to the first nozzle member.

5. The vehicle wiper of claim 1, wherein:
the urging mechanism comprises an urging spring disposed inside a base end portion of the retainer, and that uses urging force of the urging spring to urge the retainer toward a wiping position side so as to be disposed facing the windshield, or toward a flipped-up position side so as to be flipped away from the windshield,
the retainer swings with respect to the arm head between a wiping position and a flipped-up position, and
a cutout is formed at the base end portion of the retainer cover member so as to expose a portion of the urging spring toward the windshield side.

6. The vehicle wiper of claim 5, wherein
a base end side engagement portion that engages with the retainer is formed at a base end portion of the retainer cover member at both sides in the retainer cover member width direction of the cutout.

7. The vehicle wiper of claim 1, wherein:
the retainer is set with a width dimension that becomes smaller on progression toward the leading end side, and, at a position at the leading end side of the opening of the retainer, is formed with a first engagement portion that projects out toward the inside from a side wall on one side in the width direction of the retainer;
a first engagement hook is formed at a leading end portion of the retainer cover member, with the first engagement hook configured so as to be elastically deformable in the length direction of the retainer cover member and to engage with the first engagement portion and restrain movement of the leading end portion of the retainer cover member toward the windshield side;
a second engagement portion is formed at a position on a base end side of the opening of the retainer with respect to the first engagement portion, the second engagement portion projects out from the side wall on the one side in the width direction of the retainer toward the inside;
a second engagement hook configured so as to be elastically deformable in the length direction of the retainer cover member is formed at a position on a base end side of the retainer cover member with respect to the first engagement hook; and
the second engagement hook engages with the second engagement portion and restrains movement of the leading end portion of the retainer cover member toward the windshield side.

8. The vehicle wiper of claim 7, wherein:
a pair of third engagement portions is formed at positions on the base end side of the opening of the retainer with respect to the second engagement portion so as to project out from respective side walls on both sides in the retainer width direction;
a pair of third engagement hooks, configured so as to be elastically deformable toward an inside in the retainer cover member width direction, are formed at the retainer cover member; and
the third engagement hooks engage with the pair of third engagement portions and restrain movement of the retainer cover member toward the windshield side.

9. The vehicle wiper of claim 7, wherein:
a nozzle engagement tab configured so as to extend toward the other side in the width direction of the retainer and so as to be elastically deformable in the retainer width direction is formed at the first nozzle member, and the nozzle engagement tab is engaged with a side wall on the other side in the width direction of the retainer and restrains relative movement of the first nozzle member with respect to the retainer; and
a stopper is formed at the first nozzle member so as to abut the second engagement portion of the retainer and restrain movement at the first nozzle member toward the leading end side of the retainer.

10. The vehicle wiper of claim 1, further comprising:
a conductor wire that is laid out along the second hose, wherein the conductor wire is wound around the second hose at a position corresponding to a coupling portion of the retainer to the arm head.

11. The vehicle wiper of claim 10, wherein the retainer is capable of being switched between a wiping position aligned along the windshield and a flipped-up position flipped up away from the windshield by the retainer being coupled to the length direction leading end portion of the arm head so as to be capable of swinging about an axis along a direction different to that of the pivot shaft.

12. The vehicle wiper of claim 10, wherein:
a defrosting heater is provided at the second nozzle member; and
the conductor wire is a heater conductor wire connected to the heater.

13. A vehicle wiper comprising:
a retainer that is formed in an elongated shape open at a lower side facing toward a windshield, and that is provided so as to be capable of swinging about a shaft axis of a pivot shaft that is swung to-and-fro;
a first nozzle member that is housed inside the retainer, and that is capable of ejecting washer fluid from an ejection portion;
a retainer cover member that closes off an opening of the retainer,
an arm head whose base end portion is fixed to the pivot shaft, and whose leading end portion is coupled to the retainer so as to be capable of swinging;
an urging mechanism that is housed inside a length direction base end side of the retainer, and that urges the leading end side of the retainer toward the windshield side; and
a first hose, that is housed inside the retainer, that is disposed parallel to the urging mechanism and along the length direction of the retainer, and that supplies washer fluid to the first nozzle member,
wherein, a partitioning wall is provided at the retainer cover member and extends along a length direction of the urging mechanism and a length direction of the first hose so as to be interposed between the urging mechanism and the first hose, and
by slit-forming, a portion of the partitioning wall configures a resilient tab capable of flexing in a direction orthogonal to the extension direction of the partitioning wall, and an engaging portion that engages with an engaged portion of the retainer is formed at a leading end portion of the resilient tab.

14. A vehicle wiper comprising:
a retainer that is formed in an elongated shape open at a lower side facing toward a windshield, and that is provided so as to be capable of swinging about a shaft axis of a pivot shaft that is swung to-and-fro;
a first nozzle member that is housed inside the retainer, and that is capable of ejecting washer fluid from an ejection portion;
a retainer cover member that closes off an opening of the retainer,
an arm head whose base end portion is fixed to the pivot shaft, and whose leading end portion is coupled to the retainer so as to be capable of swinging;
an urging mechanism that is housed inside a length direction base end side of the retainer, and that urges the leading end side of the retainer toward the windshield side;
a first hose, that is housed inside the retainer, that is disposed parallel to the urging mechanism and along the length direction of the retainer, and that supplies washer fluid to the first nozzle member; and
a head cover member that is attached so as to permit relative swing between the arm head and the retainer while also closing off an opening of the arm head, wherein:
a partitioning wall is provided at the retainer cover member and extends along a length direction of the urging mechanism and a length direction of the first hose so as to be interposed between the urging mechanism and the first hose,
the retainer cover member is attached so as to permit relative swing between the arm head and the retainer,
the head cover member includes a resilient engagement fixing portion that engages with an engaged fixing portion provided at the corresponding arm head; and
the resilient engagement fixing portion includes a first resilient tab that is provided extending along the assembly direction of the head cover to the corresponding arm head, a second resilient tab that extends from a leading end portion of the first resilient tab so as to fold back on itself, and an engaging fixing portion that is provided at the leading end portion of the second resilient tab and engages with the engaged fixing portion.

15. The vehicle wiper of claim 14, wherein the head cover member and the retainer cover member are respectively attached to the arm head and the retainer in a mutually separated state at a coupling location where the arm head and the retainer are coupled together so as to be capable of swinging.

* * * * *